United States Patent
Jimenez et al.

(10) Patent No.: US 12,495,297 B2
(45) Date of Patent: *Dec. 9, 2025

(54) PROXIMITY BASED USER IDENTIFICATION AND AUTHENTICATION SYSTEM AND METHOD

(71) Applicant: Greet Solutions Inc., New York, NY (US)

(72) Inventors: Giovanni Jimenez, Bridgewater, NJ (US); Russell Wenger, New York, NY (US)

(73) Assignee: GREET SOLUTIONS INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/430,013

(22) Filed: Feb. 1, 2024

(65) Prior Publication Data

US 2024/0171974 A1    May 23, 2024

Related U.S. Application Data

(63) Continuation of application No. 17/156,881, filed on Jan. 25, 2021, now Pat. No. 11,895,492, which is a
(Continued)

(51) Int. Cl.
*H04W 12/06* (2021.01)
*H04W 12/033* (2021.01)
(Continued)

(52) U.S. Cl.
CPC ....... *H04W 12/068* (2021.01); *H04W 12/033* (2021.01); *H04W 12/64* (2021.01); *H04W 12/71* (2021.01)

(58) Field of Classification Search
CPC .. H04W 12/068; H04W 12/71; H04W 12/033
(Continued)

(56) References Cited

U.S. PATENT DOCUMENTS 6,678,516 B2    1/2004   Nordman et al.
6,686,838 B1    2/2004   Rezani et al.
(Continued)

OTHER PUBLICATIONS

Teh, Peng-Loon, Huo-Chong Ling, and Soon-Nyean Cheong. "NFC smartphone based access control system using information hiding." 2013 IEEE Conference on Open Systems (ICOS). IEEE, 2013 (Year: 2013).*
(Continued)

*Primary Examiner* — Syed A Zaidi
(74) *Attorney, Agent, or Firm* — K&L Gates LLP; Shu Chen

(57) ABSTRACT

The present disclosure generally relates to a system, comprising a mobile device configured to register with a service provider via an application program, obtain network credentials of communication networks operated by the service provider at various locations, connect to a communication network via the network credentials when approaching a selected location of the service provider, and transmit, to a first computing device via the communication network, a first identifier that uniquely identifies the mobile device. The system also comprises the first computing device positioned at service provider's locations and configured to receive and transmit the first identifier to a second computing device. The system also comprises the second computing device configured to receive the first identifier, compare the unique identifier to a plurality of unique identifiers, and provide a service customized to a user of the mobile device based at least upon the comparison result.

20 Claims, 11 Drawing Sheets

Related U.S. Application Data continuation of application No. 16/811,396, filed on Mar. 6, 2020, now Pat. No. 10,904,748.

(60) Provisional application No. 62/915,975, filed on Oct. 16, 2019, provisional application No. 62/814,323, filed on Mar. 6, 2019.

(51) Int. Cl.
  *H04W 12/64* (2021.01)
  *H04W 12/71* (2021.01)

(58) Field of Classification Search
  USPC .......................................................... 726/7
  See application file for complete search history.

(56) References Cited

U.S. PATENT DOCUMENTS

| | | | |
|---|---|---|---|
| 7,171,460 | B2 | 1/2007 | Kalavade et al. |
| 7,174,456 | B1 | 2/2007 | Henry et al. |
| 7,228,438 | B2* | 6/2007 | Bushmitch .......... H04L 63/0838 713/153 |
| 7,250,854 | B2 | 7/2007 | Rezani et al. |
| 8,112,797 | B2 | 2/2012 | Coskun et al. |
| 8,412,931 | B2 | 4/2013 | Vedula et al. |
| 8,413,219 | B2 | 4/2013 | Downey et al. |
| 8,478,450 | B2 | 7/2013 | Lu et al. |
| 9,191,277 | B2 | 11/2015 | Rezani et al. |
| 9,503,444 | B2 | 11/2016 | Adderly et al. |
| 10,609,048 | B2 | 3/2020 | Be'Ery et al. |
| 2003/0100315 | A1* | 5/2003 | Rankin .................. H04W 4/02 455/456.3 |
| 2006/0259361 | A1 | 11/2006 | Barhydt et al. |
| 2007/0229350 | A1 | 10/2007 | Scalisi et al. |
| 2008/0040278 | A1 | 2/2008 | DeWitt |
| 2008/0167961 | A1* | 7/2008 | Wentker ............. G06Q 20/3278 705/14.25 |
| 2009/0028082 | A1 | 1/2009 | Wynn et al. |
| 2009/0158409 | A1 | 6/2009 | Khosravi |
| 2010/0274634 | A1* | 10/2010 | Ifrah ...................... G06Q 20/40 726/30 |
| 2011/0003585 | A1 | 1/2011 | Wang et al. |
| 2011/0083169 | A1 | 4/2011 | Moeller et al. |
| 2011/0151890 | A1* | 6/2011 | Platt ........................ H04L 67/52 455/456.1 |
| 2011/0286437 | A1 | 11/2011 | Austin et al. |
| 2013/0065557 | A1 | 3/2013 | Xining et al. |
| 2013/0085620 | A1 | 4/2013 | Lu et al. |
| 2014/0222955 | A1* | 8/2014 | Islam .................. H04L 63/0428 709/217 |
| 2014/0258441 | A1 | 9/2014 | L'Heureux et al. |
| 2014/0266594 | A1* | 9/2014 | Reiser .................. G06Q 30/016 340/5.2 |
| 2014/0370879 | A1* | 12/2014 | Redding ........... H04M 3/42178 455/419 |
| 2015/0223070 | A1 | 8/2015 | Chhabra et al. |
| 2015/0312758 | A1* | 10/2015 | Redford ................ H04W 12/35 455/410 |
| 2016/0127899 | A1 | 5/2016 | Jabara et al. |
| 2016/0330266 | A1 | 11/2016 | Bakhmutov |
| 2018/0068111 | A1* | 3/2018 | Chen ....................... G06F 21/31 |
| 2018/0115892 | A1 | 4/2018 | Kotay et al. |
| 2018/0183778 | A1* | 6/2018 | Bettenburg ........... H04L 63/083 |

OTHER PUBLICATIONS

NPL Search Terms (Year: 2024).*

International Search Report and the Written Opinion for International application No. PCT/US2020/021406, filed Mar. 6, 2020, mailed on Jun. 5, 2020 by International Searching Authority, 7 pages.

Extended European Search Report and European Search Opinion for European application No. 20767210.6, mailed on Dec. 17, 2021 by the European Patent Office, 10 pages.

Allurwar, Navalkrushna, Balasaheb Nawale, and Swapnesh Patel. "Beacon for proximity target marketing." Int. J. Eng. Comput. Sci. vol. 5 issue 5 (2016): 16359-16364.

LaMarca, Anthony, et al. "Place lab: Device positioning using radio beacons in the wild." International Conference on Pervasive Computing. Springer, Berlin, Heidelberg, 2005.

* cited by examiner

PROXIMITY BASED USER IDENTIFICATION AND AUTHENTICATION SYSTEM AND METHOD

CROSS-REFERENCE TO RELATED APPLICATIONS

This application is a continuation U.S. patent application Ser. No. 17/156,881, filed Jan. 25, 2021 which is a continuation of U.S. patent application Ser. No. 16/811,396, filed Mar. 6, 2020, now U.S. Pat. No. 10,904,748 which claims priority to U.S. Provisional Patent Application No. 62/814,323, filed Mar. 6, 2019, and U.S. Provisional Patent Application No. 62/915,975, filed Oct. 16, 2019, the contents of which are herein incorporated by reference.

FIELD OF TECHNOLOGY

The present disclosure generally relates to proximity based identification and authentication of a person or group of persons, and more particularly relates to identification and authentication of a person or group of persons carrying a mobile computing device (e.g., a smart device) and passing a monitored area or location.

BACKGROUND

The ability to quickly and uniquely identify a person who enters a store, a bank branch, a hospital or clinic, a company, or a building in general, or to identify a person who passes by a certain location, has been a critical objective of companies seeking to differentiate themselves from competitors, especially in a time when sales at "brick & mortar" stores are being replaced at a staggering rate by online stores.

Banks, retail stores and institutions in general can have a competitive advantage if they can identify a customer, a potential customer or a very important person (VIP) customer who enters or passes by a store or a location, because they can provide that customer with preferential, personalized and differentiated customer service (e.g., special personalized communications, "discount coupons," faster service, special and safer medical treatment, physical access or other services that will result in greater revenues and improved loyalty).

Traditional "automated" identification techniques of a person have been restricted to identifying the face or facial characteristics of the person by taking a photo of the person entering or passing by a store (or a company building in general), and comparing that photo with a very large database of users previously registered with that store or company (what is called a 1:N matching). This process is generally slow, inaccurate and expensive, because those databases contain hundreds of thousands or millions of registered users, the photos taken of the person walking into a store or by a location are normally of low quality which leads to a high rate of either false positives or false negatives, and those methods normally use expensive cameras and complex software to do the matching of the person against the database of registered users.

Accordingly, there is a need for a system and method for quickly and accurately identifying a person or group of persons entering or passing by e.g., a store, a bank branch, a building, or any other location, such that a differentiated and targeted service can be provided to that person or group of persons, if they choose to receive such service.

SUMMARY

According to an aspect of the present disclosure, there is provided a system, comprising a mobile device, a first computing device, and a second computing device. The mobile device may comprise a non-transitory computer-readable storage medium configured to store at least one application program; and a processor coupled to the non-transitory computer-readable storage medium and configured to control a plurality of modules to execute instructions of the at least one application program for: registering with at least one service provider via the at least one application program, obtaining at least network credentials of communication networks operated by the at least one service provider at various locations, detecting and connecting to a communication network via the network credentials when approaching a selected location of the at least one service provider, and transmitting, to a first computing device via the communication network, a first identifier that uniquely identifies the mobile device. The first computing device positioned at the selected location of the at least one service provider and configured to detect and receive the first identifier when the mobile device approaches the selected location and transmit the first identifier to a second computing device. The second computing device configured to receive the first identifier of the mobile device from the first computing device, compare the unique identifier to a plurality of unique identifiers, and initiate an event to determine and provide a service customized to a user of the mobile device based at least upon a comparison result of the first identifier to the plurality of unique identifiers.

In an embodiment, the mobile device may be a smart device, and the first identifier of the mobile device may comprise a factory media access control (MAC) address of the mobile device. The second computing device may be configured to store the plurality of unique identifiers associated with a plurality of mobile devices. The service customized to the user of the mobile device may comprise at least one of: greeting, recognizing and authenticating the user of the mobile device within a range of the selected location.

Further, the processor of the mobile device may be configured to: register with the at least one service provider via the at least one application program within the selected location of the at least one service provider; store at least the network credentials of communication networks operated by the at least one service provider at the various locations on the non-transitory computer-readable storage medium; detect and connecting to a different communication network via the network credentials when approaching a different location of the at least one service provider; and receive the service customized to the user of the mobile device at the different location of the at least one service provider.

In another embodiment, the processor of the mobile device may be further configured to: register with the at least one service provider via the at least one application program away from the various locations of the at least one service provider; store at least the network credentials of communication networks operated by the at least one service provider at the various locations on the non-transitory computer-readable storage medium; and in response to detecting a failed connection using the network credentials, obtain a second identifier from the second computing device. The first computing device is configured to continuously broadcast at least a beacon signal at the selected location of the at least one service provider, wherein the processor of the mobile device is configured to transmit the second identifier to the first computing device in response to detecting the beacon signal when approaching the selected location. The processor of the mobile device may be further configured to: in response to detecting the beacon signal, connect to a network available at the selected location of the at least one service provider via the network credentials; and transmit, to the first computing device via the network, the first identifier that uniquely identifies the mobile device.

In yet another embodiment, the processor of the mobile device may be configured to store the network credentials to a list of trusted communication networks on the mobile device.

In an additional embodiment, the processor of the mobile device may be configured to: obtain information related to a user carrying the mobile device in response to determining that the user needs to be authenticated; generate data for uniquely identifying the user based at least on the information related to the user; encrypt the data uniquely identifying the user; store encrypted data uniquely identifying the user on the non-transitory computer-readable storage medium of the mobile device; and transmit the encrypted second data to the first computing device.

The information related to the user carrying the mobile device may comprise a biometric or non-biometric characteristic of the user including at least one of: a fingerprint, a palm/finger vein pattern, a voice pattern, a facial image, a palm print, a hand geometry, a retina and iris recognition, a digital signature, a username and password, and a token.

According to an aspect of the present disclosure, there is provided a method, comprising: registering, by a mobile device, with at least one service provider via at least one application program installed on the mobile device; obtaining, by the mobile device, at least network credentials of communication networks operated by the at least one service provider at various locations; detecting and connecting, by the mobile device, to a communication network via the network credentials when approaching a selected location of the at least one service provider; transmitting, from the mobile device to a first computing device via the communication network, a first identifier that uniquely identifies the mobile device, wherein the first computing device is positioned at the selected location of the at least one service provider; detecting and receiving, by the first computing device, the first identifier in response to detecting that the mobile device approaches the selected location; transmitting, by the first computing device, the first identifier to a second computing device; receiving, by the second computing device from the first computing device, the first identifier of the mobile device; comparing, by the second computing device, the unique identifier to a plurality of unique identifiers; and initiating, by the second computing device, an event to determine and provide a service customized to a user of the mobile device based at least upon a comparison result of the first identifier to the plurality of unique identifiers.

In an embodiment, the mobile device may comprise a smart device, and the first identifier of the mobile device may comprise at least a factory media access control (MAC) address of the mobile device. The service customized to the user of the mobile device comprises at least one of: greeting, recognizing and authenticating the user of the mobile device within a range of the selected location.

Further, the method may comprise storing, by the second computing device, the plurality of unique identifiers associated with a plurality of mobile devices.

In an embodiment, the method may comprise registering, by the mobile device, with the at least one service provider via the at least one application program within the selected location of the at least one service provider; storing, by the mobile device, at least the network credentials of communication networks operated by the at least one service provider at the various locations on a non-transitory computer-readable storage medium of the mobile device; detecting and connecting, by the mobile device, to a different communication network via the network credentials when approaching a different location of the at least one service provider; and receiving, by the mobile device, the service customized to the user of the mobile device at the different location of the at least one service provider.

In another embodiment, the method may comprise registering, by the mobile device, with the at least one service provider via the at least one application program away from the various locations of the at least one service provider; storing, by the mobile device, at least the network credentials of communication networks operated by the at least one service provider at the various locations on the non-transitory computer-readable storage medium; and in response to detecting a failed connection using the network credentials, obtaining, by the mobile device, a second identifier from the second computing device.

In an embodiment, the method may comprise continuously broadcasting, by the first computing device, at least a beacon signal at the selected location of the at least one service provider; and transmitting, by the mobile device, the second identifier to the first computing device in response to detecting the beacon signal when approaching the selected location; in response to detecting the beacon signal, connecting, by the mobile device, to a network available at the selected location of the at least one service provider via the network credentials; and transmitting, from the mobile device to the first computing device via the network, the first identifier that uniquely identifies the mobile device.

In addition, the method may comprise storing, by the mobile device, the network credentials to a list of trusted communication networks on the mobile device.

In an embodiment, the method may comprise obtaining, by the mobile device, information related to a user carrying the mobile device in response to determining that the user needs to be authenticated; generating, by the mobile device, data for uniquely identifying the user based at least on the information related to the user; encrypting, by the mobile device, the data uniquely identifying the user; storing, by the mobile device, encrypted data uniquely identifying the user on the non-transitory computer-readable storage medium of the mobile device; and transmitting, by the mobile device, the encrypted second data to the first computing device. The information related to the user carrying the mobile device may comprise a biometric or non-biometric characteristic of the user including at least one of: a fingerprint, a palm/finger vein pattern, a voice pattern, a facial image, a palm print, a hand geometry, a retina and iris recognition, a digital signature, a username and password, and a token.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
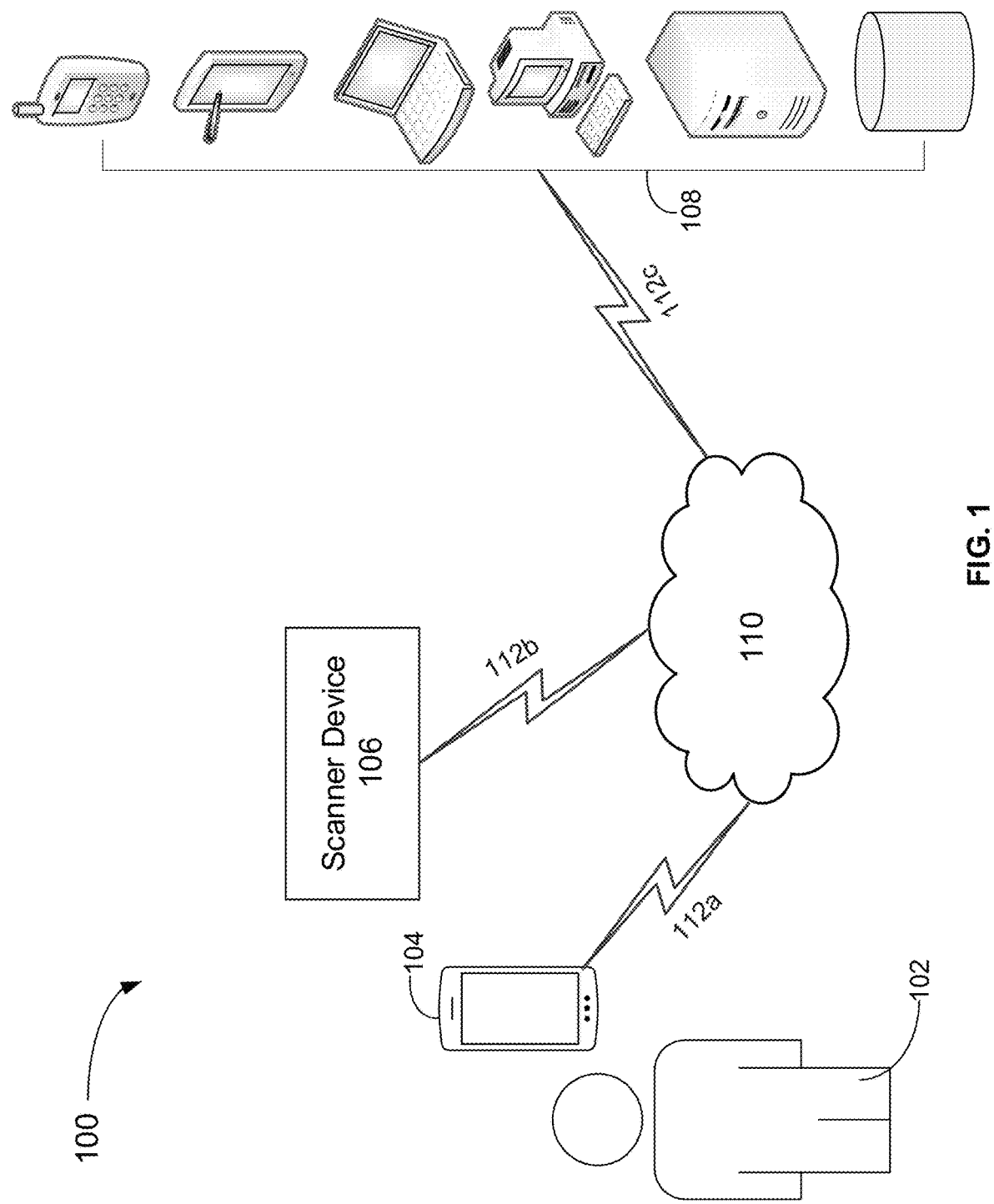
FIG. 1 illustrates a system for identifying and authenticating at least one user based on identification of a mobile computing device carried by the user when the user enters or passes by an area or a location, according to an exemplary aspect of the present disclosure.

Various aspects of invention will be described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below.

According to aspects of the present disclosure, FIG. 1 generally illustrates a system 100 configured for identifying and authenticating at least one user 102 and a mobile computing device 104 carried by the user when the user enters or passes by an area or a location. An example area may include a bank's branch, automated teller machine (ATM), retail store, building, hospital, airport, bus or train station, school or college campus, government institution, or any selected area where quick and accurate identification and authentication of the user 102 may be needed. System 100, as shown, may comprise at least one scanner device 106 positioned at a designated location within or in the vicinity of the area for at least detecting communication signals (e.g., WiFi, Bluetooth, Bluetooth low energy (BLE), or any other short or medium-range communication signals) broadcasted by the mobile computing device 104. In an alternative embodiment, scanner device 106 may be mounted on a car or any other mobile transportation system to detect greater or remote areas. Mobile computing device 104 of the present disclosure may include any electronic device (e.g., smartphones, smart watches, eReaders, iPads, smart eyeglasses, virtual or augmented reality devices, tablets, laptops, other portable computing devices) that may be cordless (unless while being charged), mobile (easily transportable and often having a small form factor), always connected to other devices, networks, appliances, or computer systems via suitable communication protocols. Mobile computing device 104 may include at least one built-in processor, microprocessor, multi-core processor or central processor unit (CPU) (collectively "processor") coupled to an embedded memory to carry out voice and/or video communication, data processing, Internet browsing, geolocation and operate to some extent autonomously and interactively with the user 102. In accordance with aspects of the present disclosure, mobile computing device 104 may be configured to broadcast a unique identifier via Wifi, Bluetooth, BLE, or any other short or medium-range communication protocols.

As shown in FIG. 1, mobile computing device 104 and scanner device 106 may be configured to communicate with one or more local or remote computing server system 108 via a communication network 110 using suitable network connections and protocols 112a, 112b, and 112c. A communication network (e.g., communication network 110) may refer to a geographically distributed collection of computing devices or data points interconnected by communication links and segments for transporting signals and data there between. A protocol (e.g., protocols 112a, 112b, and 112c) may refer to a set of rules defining how computing devices and networks may interact with each other, such as frame relay, Internet protocol (IP), transmission control protocol (TCP), user datagram protocol (UDP), hypertext transfer protocol (HTTP). Many types of communication networks are available, ranging from local area networks (LANs), wide area networks (WANs), cellular networks, to overlay networks and software-defined networks (SDNs), a packet data network (e.g., the Internet), mobile telephone networks (e.g., cellular networks, such as 4G or 5G), Plain Old Telephone (POTS) networks, and wireless data networks (e.g., Institute of Electrical and Electronics Engineers (IEEE) 802.11 family of standards known as WiFi, WiGig, IEEE 802.16 family of standards known as WiMax), IEEE 802.15.4 family of standards, a Long Term Evolution (LTE) family of standards, a Universal Mobile Telecommunications System (UMTS) family of standards, peer-to-peer (P2P) networks, virtual private networks (VPN), Bluetooth, BLE, Near Field Communication (NFC), or any other suitable network.

For example, communication network 110 may be a LAN configured to connect each, any, and all computing devices including mobile computing device 104 and scanner device 106 deployed within a selected area such as a company, institution, store, building, bank branch, agency, hospital, clinic, campus, etc. Communication network 110 may be a WAN configured to connect computing devices deployed within a selected area and other geographically dispersed computing devices and networks over long-distance communications links, such as common carrier telephone lines, optical light paths, synchronous optical networks (SONET), or synchronous digital hierarchy (SDH) links. The Internet may be used to connect disparate devices and networks throughout the world, providing global communication among nodes (a node of an Internet has an IP address) on various networks. These nodes may communicate over the communication network 110 by exchanging discrete frames or packets of data according to protocols 112a-112c, such as TCP/IP. Communication network 110 may be further interconnected by an intermediate network node, such as a router and/or gateway device, to extend the effective size of each network.

In one embodiment, system 100 may employ a Cloud-based communication network 110 for providing computing services using shared resources. Cloud computing may generally include Internet-based computing in which computing resources are dynamically provisioned and allocated to each connected computing device or other devices on-demand, from a collection of resources available via the network or the Cloud. Cloud computing resources may include any type of resource, such as computing, storage, and networking. For instance, resources may include service devices (firewalls, deep packet inspectors, traffic monitors, load balancers, etc.), compute/processing devices (servers, CPUs, GPUs, random access memory, caches, etc.), and storage devices (e.g., network attached storages, storage area network devices, hard disk drives, solid-state devices, etc.). In addition, such resources may be used to support virtual networks, virtual machines, databases, applications, etc.

Cloud computing resources accessible via communication network 110 may include a private cloud, a public cloud, and/or a hybrid cloud. For example, a private cloud may be a cloud infrastructure operated by an enterprise for use by the enterprise, while a public cloud may refer to a cloud infrastructure that provides services and resources over a network for public use. In a hybrid cloud computing environment which uses a mix of on-premises, private cloud and third-party, public cloud services with orchestration between the two platforms, data and applications may move between private and public clouds for greater flexibility and more deployment options.

In accordance with an aspect, the one or more local or remote computing server system 108 of the present disclosure may be Cloud-based and may comprise at least one of personal computers, servers, server farms, laptops, tablets, mobile devices, smart phones, smart watches, fitness tracker devices, cellular devices, gaming devices, media players, network enabled printers, routers, wireless access points, network appliances, storage systems, gateway devices, smart home devices, virtual or augmented reality devices, or any other suitable devices that are deployed in the same or different communication network of mobile computing device 104 and scanner device 106. Computing server system 108 may be configured to provide functionalities for any connected devices such as sharing data or provisioning resources among multiple client devices, or performing computations for each connected client device.

As will be described fully below, system 100 of the present disclosure may be implemented in various contexts for identifying and authenticating purposes when mobile computing device 104 carried by user 102 is detected by scanner device 106 based at least on a unique identifier broadcast by mobile computing device 104. Scanner device 106 may be positioned at a designated location of an area, such as an entrance of a facility for at least detecting the broadcast of the mobile computing device 104. In order to enable certain types of transactions that may involve confidential, sensitive, private, or secret information, such as a monetary transfer, system 100 may be configured to provide an additional level of authentication such as a biometric authentication of user 102 via mobile computing device 104.

For example, user 102 may be pre-registered with a service provider such as a bank's branch office, retail company, hospital, airport, bus or train station, school, college, government institution, or any institution. User 102 may have opted in for the detection, recognition, greeting and possible authentication when entering or passing by one of the service provider's locations where scanner device 106 has been implemented. When user 102 is in the vicinity of such a location, mobile computing device 104 carried by user 102 may be configured to broadcast a unique identifier (e.g., media access control (MAC) address of mobile computing device 104) via WiFi, Bluetooth, or BLE protocols.

With respect to a non-registered user 102 who may not be aware of the existence of the service provider, mobile computing device 104 of user 102 may be detected by scanner device 106 when in the vicinity of such a location. System 100 may be configured to generate communication signals to mobile computing device 104 to ask user consent for receiving differentiated or additional services from the service provider, or becoming a new customer of the service provider.

Furthermore, system 100 may be configured to offer services by multiple service providers with one or more incentives upon detecting mobile computing device 104 carried by a non-registered user 102. For example, free WiFi may be provided when user 102 enters a service provider's location in exchange for accepting the terms of a specific service, which may include user 102 consenting to one or more services provided by other service providers. As such, user 102 may receive messages, recognition or greeting when entering locations of the other service providers.

In another example, system 100 may be configured to recognize and authenticate "good actors," so as to, e.g., improve the travelers' flow and security in mass attended events, like sports events at stadia, major religious or cultural events, mass transit locations like airports, bus or train stations, etc. "Good actors" may refer to those who have pre-registered with the system 100 and have completed a verification process of at least one government issued identification document. These users have opted-in to be recognized and authenticated by system 100 when passing by one or more scanner devices 106 installed in predetermined locations in stadia or mass transit locations.

In yet another example, unlike the aforementioned situations where scanner device 106 is installed at a service provider's location, a global positioning system (GPS) enabled scanner device 106 may be mounted on mobile platforms such as an automobile, a train, a ship, an airplane, etc. As such, user 102 does not have to necessarily enter a service provider's physical facility to be recognized through mobile computing device 104, thereby allowing each service provider to expand its scope to users anywhere such mobile scanner devices 106 are installed.

Figure 2:
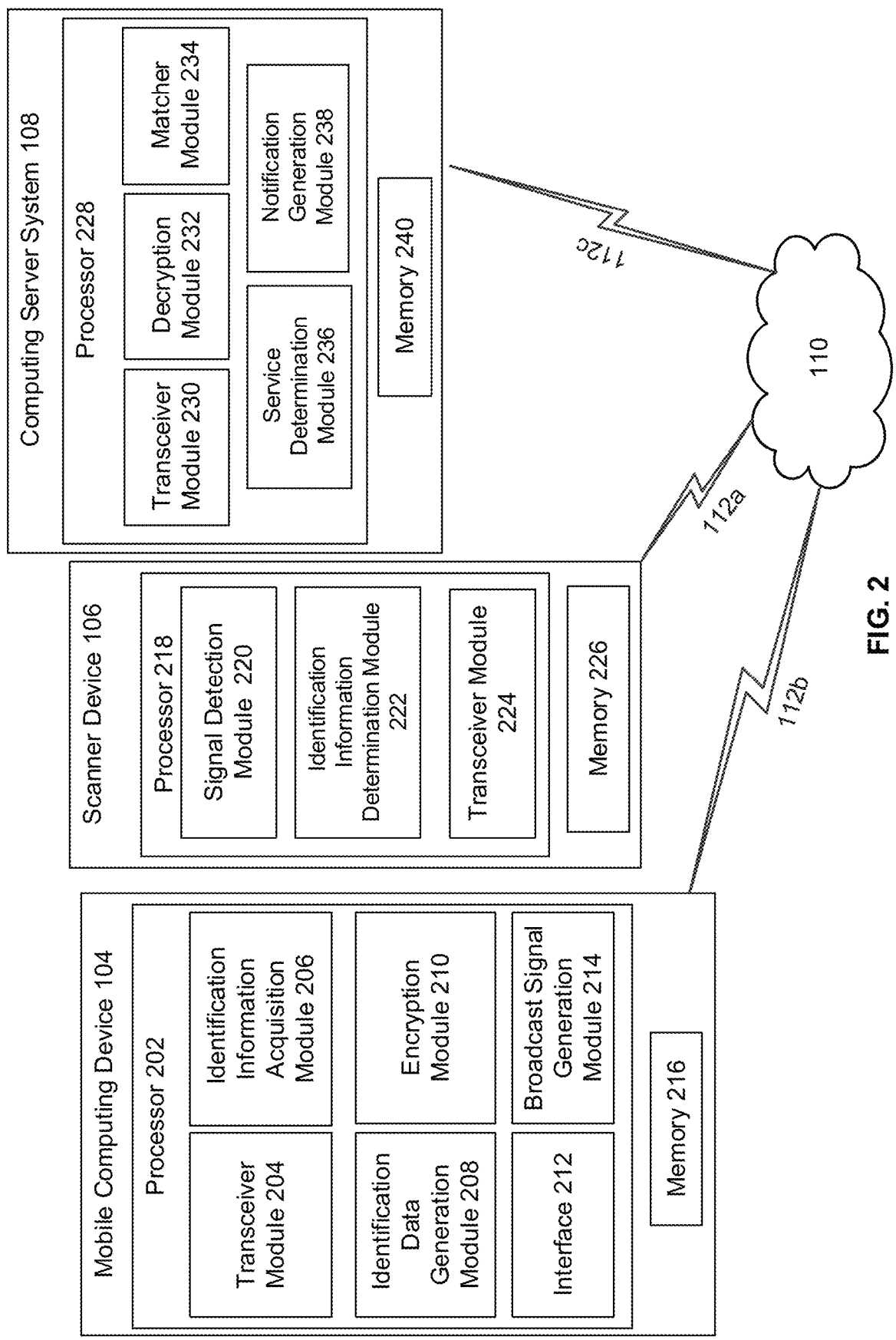
FIG. 2 illustrates a diagram of the system shown in FIG. 1, according to an exemplary aspect of the present disclosure.

Referring to FIG. 2, mobile computing device 104 of system 100 may include at least one processor 202 configured to control and execute a plurality of modules including a transceiver module 204, an identification information acquisition module 206, an identification data generation module 208, an encryption module 210, an interface 212, and a broadcast signal generation module 214. The term "module" as used herein refers to a real-world device, component, or arrangement of components and circuitries implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special purpose device. A module may also be implemented as a combination of the two, with certain functions facilitated by hardware alone, and other functions facilitated by a combination of hardware and software. Each module may be realized in a variety of suitable configurations, and should not be limited to any example implementation exemplified herein.

Memory 216, which is coupled to the processor 202, may be configured to store at least a portion of information obtained by mobile computing device 104. In one aspect, memory 216 may be a non-transitory machine readable medium configured to store at least one set of data structures or instructions (e.g., software) embodying or utilized by at least one of the techniques or functions described herein. It should be appreciated that the term "non-transitory machine readable medium" may include a single medium or multiple media (e.g., one or more caches) configured to store the at least one instruction. The term "machine readable medium" may include any medium that is capable of storing, encoding, or carrying instructions for execution by all modules of mobile computing device 104 and that cause these modules to perform at least one of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

In accordance with aspects of the present application, transceiver module 204 may be configured by processor 202 of mobile computing device 104 to exchange various information and data with scanner device 106 and local or remote computing server system 108. For example, user 102 may download on mobile computing device 104 an application or update an existing application provided by a service provider that allows detecting information related to user 102 and device 104 for future identification and/or authentication. In situations where a service provider may intend to communicate with user 102 and provide non-risky services for marketing or promotion purposes, user authentication may not be necessary. In other words, user authentication may be recommended and encouraged when a service provider or user 102 intend to follow a process that involves for example, but not limited to, a monetary transaction, providing user 102 with access to a restricted area, or a medical procedure to user 102, etc.

For first time registration, user 102 may open an interface 212 of (e.g., graphical user interface (GUI)) on mobile computing device 104. Identification information acquisition module 206 may be configured by processor 202 to obtain or extract measurable biological or behavior characteristics for the purpose of uniquely identifying or authenticating an individual. In one aspect, unique biometric or non-biometric characteristics of user 102 may be in the form of at least one of: a fingerprint, a palm/finger vein pattern, a voice pattern, a facial image, a palm print, a hand geometry, a retina and iris recognition, a digital signature, a username and password, and a token. For example, identification information acquisition module 206 may include a touch sensor and corresponding circuitry configured to record a series of images of user 102's fingerprint (e.g., single finger, or multi-finger, and/or palm). Alternatively, module 206 may include a voice recognition software trained by having user 102 repeat certain commands, statements, or sentences multiple times to determine a voice pattern of user 102. In one embodiment, module 206 may include image sensing circuitry to record user 102's retina and iris or any suitable facial features from multiple angles to derive a biometric optical signature. Processor 202 may be configured to perform a real-time quality analysis of captured biometric or non-biometric data of user 102 using programmable quality thresholds. For example, processor 202 may encode or compress raw data captured by identification information acquisition module 206 and perform filtering, edge correction, edge enhancement or similar data processing to enhance data quality.

Subsequently, identification data generation module 208 may be configured to generate unique pattern data based at least on the enhanced biometric or non-biometric data of user 102. The output of module 208 may include a digital, mathematical and/or geometrical representation of the input data obtained from module 206 for uniquely identifying user 102. For example, module 208 may be configured to detect at least one feature point in captured images of fingerprints of user 102, such as the topmost point of the innermost ridge lines of a specific finger, or a point with highest curvature. Subsequently, minutia points (e.g., 40-100) of each fingerprint may be extracted by taking the feature point as reference and a binary image may be generated such that each pixel is represented as a single bit (0 or 1). Next, module 208 may be configured to reduce the amount pixels in the binary image by removing all redundant pixels and produce a new simplified image with the minimum number of pixels possible. Additional processing may be carried out to determine a region of interest and unique minutiae which may be represented as a matrix. A unique identification (a quick response code, or a bar code) of user 102 may be generated by module 208 based at least on the matrix.

Moreover, identification information acquisition module 206 may be configured to obtain a unique code or identifier of mobile computing device 104. For example, Bluetooth personal area network (PAN) may have unique identifiers associated with any connected Bluetooth device. Similarly, each LAN device that operates an IEEE 802.11 or IEEE 802.16 device may have a MAC identifier. In a cellular telephone network, each device compatible with the network may have an Electronic Serial Number (ESN) that is unique to the device. Other wireless systems may have other device identification schemes.

In accordance with aspects of the present disclosure, mobile computing device 104 may use a broadcast signal generation module 214 to continuously or periodically broadcast its unique identifier while being turned on, where any periodicity of broadcast may be configured or defined by a serving communication network. This identifier may be used within a particular communication standard as part of a mechanism for establishing one-way or two-way communications with other computing devices such as scanner device 106 and local or remote computing server system 108. For example, communications circuitry of module 214 may be implemented according to any of the 802.11 protocols. In one embodiment, module 214 may be a low power Wireless Personal Area Network (6LoWPAN) module or a ZigBee module capable of communicating according to 802.15.4 protocol, BLE, or any combination thereof.

In one aspect, mobile computing device 104 and scanner device 106 may have a mechanism for configuring a two-way wireless communication session, and may have a defined protocol for establishing an initial connection and later reconnecting with each other without user interaction. That is, scanner device 106 may be configured to detect the presence of a broadcasting mobile computing device 104 within a detection range and automatically establish a communication session. User 102 may register more than one mobile device, and the service provider's registration routine will extract the unique identifier from each device.

For additional security, information relating to biometric or non-biometric data of user 102 and the unique identifier of mobile computing device 104 may be encrypted by encryption module 210. Example encryption methods may utilize random number generators, secured hashing algorithm (SHA-1, SHA-2, or SHA-3), message digest (MD2, MD5), DES (e.g., Digital Encryption Standard), 3DES (e.g., Triple DES), rivest cipher (e.g., RC4), ARC4 (e.g., related to RC4), TKIP (e.g., Temporal Key Integrity Protocol, uses RC4), advanced encryption standard (AES), RSA, DSA, DH, NTRU, and elliptic curve cryptography (ECC), private key authentication (PKA), Device-Unique Secret Key and other cryptographic key data, SSL, serpent, twofish, blowfish, and international data encryption algorithm (IDEA). Encrypted data may be stored on memory 216, or transmitted by transceiver module 204 via the communication network 110, to the service provider and stored on the service provider's storage database (e.g., local or remote computing server system 108), on the Cloud or on any other storage database chosen by the service provider. As a result, user 102 and mobile computing device 104 become registered with the service provider.

After transmitting the encrypted identifying data of user 102 and mobile computing device 104, the original image and data captured by mobile computing device 104 may be either deleted from memory 216 to prevent being retrieved maliciously by others or retained by the service provider on local or remote computing server system 108 for auditing or some other purposes.

As further shown in FIG. 2, scanner device 106 of system 100 may include at least one processor 218 configured to control and execute a plurality of modules including a signal detection module 220, and a transceiver module 224. Memory 226, which is a non-transitory machine readable medium coupled to the processor 218 of scanner device 106, may be configured to store at least a portion of information obtained by scanner device 106 and at least one set of data structures or instructions (e.g., software) embodying or utilized by at least one of the techniques or functions described herein.

In one embodiment, signal detection module 220 of scanner device 106 may be configured to continuously scan for WiFi, Bluetooth, BLE, or other short or medium range communications signals broadcast by various mobile computing devices 104 within its detection range in order to identify a registered user 102.

The identification information determination module 222 may be configured to segregate a valid signal from other signals and noise received by the scanner device 106, and extract the unique code or identifier of mobile computing device 104 from the signal.

Next, transceiver module 224 of scanner device 106 may be configured to transmit at least a portion of encrypted device identifying information to a local data repository system of the service provider where the device 104 has been identified, or to a remote location via the communication network 110 where the identifier of device 104 may be compared against previously registered devices in a user database through a matching application and process. In one embodiment, scanner device 106 may include an encryption/decryption module (not shown) to decrypt signals received from mobile computing device 104 to retrieve certain information for local processing and encrypt sensitive information such as confidential or proprietary data into an encoded form before transmitting such information to another device or system via communication network 110.

In one aspect, computing server system 108 of system 100 may include at least one processor 228 configured to control and execute a plurality of modules including a transceiver module 230, a decryption module 232, a matcher module 234, a service determination module 236, and a notification generation module 238. Memory 240, which is a non-transitory machine readable medium coupled to the processor 228, may be configured to store at least information related to registered users and devices of a specific service provider and at least one set of data structures or instructions (e.g., software) embodying or utilized by at least one of the techniques or functions described herein.

Specifically, decryption module 232 may be configured to decrypt received signals by transceiver module 230 to determine the MAC address or other available device identifier associated with a detected mobile device, the type of device, approximate distance between the device and scanner device 106, and if possible the brand of the device.

According to aspects of the present disclosure, user 102 may register for receiving a service provided by a service provider at a store or a location where a communication network (e.g., WiFi network) is available (e.g., a Bank's branch where a secure on-site WiFi network is provided to customers). During the registration process, user 102 may use mobile computing device 104 to connect with the detected WiFi network which may be stored on the mobile computing device 104 as a secure and trusted network. A service provider may offer multiple geographically dispersed offices, locations, or branches with WiFi networks that share same network credentials. As such, when user 102 carries mobile computing device 104 and visits the same location or a different location of the same service provider in the future, mobile computing device 104 may be configured to automatically connect to a detected trusted WiFi network. For example, mobile computing device 104 may use broadcast signal generation module 214 to continuously or periodically broadcast its unique identifier while being turned on. The manufacturer's or factory MAC address of mobile computing device 104 may be broadcast by module 214 and detected by scanner device 106 at a service provider location for identifying user 102 who has registered with the service provider. Manufacturer's or factory MAC address refers to a unique identifier of each mobile computing device 104 assigned by each respective device manufacturer. Such identifier may be hard-coded on a network interface controller and cannot be changed. In another embodiment, mobile computing device 104 may broadcast both its manufacturer's or factory MAC address and a random MAC address, and signal detection module 220 of scanner device 106 may be configured to extract the manufacturer's or factory MAC address of mobile computing device 104 from received broadcast signals.

User registration may take place while user 102 is away from a service provider location (off-premise registration). As a result, mobile computing device 104 of user 102 may not connect to any of the service provider's communication networks during registration. In accordance with aspects of the present disclosure, during this off-premise registration process, user 102 may be asked (e.g., via the downloaded application) to provide consent for the use and recognition of Bluetooth signals such as a Bluetooth beacon signal, push notification, assignment of the service provider's WiFi network as a reliable network in the future, and background work when the application is installed on mobile device 104 of user 102. Further, in some example implementation, a number of network credentials shared among various geographically dispersed offices, locations, or branches WiFi networks operated by the service provider may be transmitted to and saved on the mobile computing device 104 as secure and trusted during this registration process. As such, the mobile computing device 104 may automatically connect to any office, location, or branch of the service provider in the future using the saved network credentials.

In accordance with an important aspect of the present disclosure, a unique device identification (UUID) may be assigned (e.g., local or remote computing server system 108 or any server system used for the registration process) and installed on mobile computing device 104 during this off-premise registration process. In addition, each scanner device 106 positioned at each service provider's location may be configured to constantly broadcast a beacon signal (e.g., Bluetooth beacon). When user 102 enters for the first time after registration a service provider location that is covered by a WiFi network, the user's mobile computing device 104 may be configured to automatically connect to this WiFi network that has been identified as trusted and secure during registration. For example, the transceiver module 204 of mobile computing device 104 may be configured to detect the beacon signal broadcast by scanner device 106, and respond by sending the previously assigned UUID during the off-premise registration process to the scanner device 106. Upon detecting and recognizing the UUID, the transceiver module 224 of scanner device 106 may transmit the UUID to computing server system 108 where this unique identifier may correlate with the one previously registered by the user. As a result, the factory MAC address of the mobile computing device 104 may be identified.

For subsequent user visits to the same or a different service provider's location, it may not be necessary for user's mobile computing device 104 to detect the Bluetooth beacon broadcast by scanner device 106, because the service provider's WiFi network has already been stored on the user's mobile computing device 104 as trusted and secure. Therefore, an automatic WiFi connection may be carried out and the factory MAC address of the mobile computing device 104 may be identified.

In one embodiment, each scanner device 106 positioned at each service provider's location and a detected mobile computing device 104 registered with the same service provider may be configured to synchronize to a common time source (e.g., a common system clock), such that both devices may negotiate a time frame for exchange of synchronization information. For example, scanner device 106 may broadcast a specific beacon frame at a frequency decided by each implementation (e.g., based on the device's power budget). Such a beacon frame may be based on IEEE 802.11 Beacon management frame format and may be modified to include other information (e.g., a local network identifier or other unique network attributes). Scanner device 106 and mobile computing device 104 may be configured to detect and communicate with each other with low power consumption and synchronize their clocks to the common clock before start exchanging information. For example, when a signal strength of at least one synchronization beacon frame broadcast by scanner device 106 and received by mobile computing device 104 exceeds a selected threshold, the devices may be considered to detect each other for further communication. To improve privacy and security, mobile computing device 104 may randomly select a local MAC address via, e.g., MAC randomization techniques administered at an access point of a wireless communication system, MAC randomization techniques administered at the device, or a combination of both, to avoid address tracking. This so-called MAC address randomization may vary in technical details for different computing devices. MAC address randomization events may affect the ability of WiFi localization techniques to track mobile devices according to addresses as they are no longer persistent. In accordance with aspects of the present disclosure and as disclosed herein, the means and frequency of such MAC address changing by mobile computing device 104 due to MAC address randomization presents no issue to the detection and identification of mobile computing device 104.

As further shown in FIG. 2, matcher module 234 of computing server system 108 may be configured to use the decrypted information to determine if the detected mobile computing device 104 has been registered to an existing device stored in the memory 240. If the mobile computing device 104 does not match any of the registered devices in the memory 240, the received device identifying information may be deleted from the computing server system 108 and the scanner device 106 continues scanning for other devices. In one aspect, for an identified mobile computing device 104, computing server system 108 may be configured to generate and transmit a beacon to the device 104, and invite the user 102 to register in the available communication network and ask for consent of the user 102 to be recognized and greeted in the future.

Upon determining that the detected mobile computing device 104 matches a registered device in the memory 240, service determination module 236 may be configured to gather user information linked to the device 104 in order to determine whether the user 102 needs preferential, targeted or differentiated service. If the user 102 is not identified as someone who needs preferential, targeted or differentiated service, the received device identifying information may be deleted from computing server system 108 or encrypted and retained centrally by another computer system for future use upon consent from the user 102, and scanner device 106 continues scanning for other devices.

If user 102 is indeed identified as someone who needs preferential, targeted or differentiated service, service determination module 236 may be configured to transmit personal communications, coupons or rebates to the user's mobile computing device 104. Alternatively, a notification generation module 238 may be configured to inform an employee at the service provider's location to greet the user 102. Further, depending on the nature of the visit of the user 102 to the service provider's location, authentication of the user 102 may be carried out in order for the service provider to provide further services, such as monetary transactions. For example, user 102 may be authenticated either through biometric or some other authentication methods preferred by the service provider.

If biometric authentication is used, the authentication may be performed locally with the matching done on the user's mobile computing device 104, or with the matching done on the service provider's premises, remotely (e.g., on the Cloud) or on any other system and location preferred by the service provider.

If user 102 is positively authenticated, the service provider may provide preferential services depending on the nature of the user's visit to the service provider's location. If user 102 is not positively authenticated, service determination module 236 of system 100 may be configured to terminate the authentication process, or determine why a registered mobile computing device 104 is carried by a user that cannot be authenticated.

In accordance with aspects of the present disclosure, system 100 may be configured to implement an authentication method using some of the user 102's biometric characteristics. For example, user 102 may use mobile computing device 104 via identification information acquisition module 206 to capture an image of his/her face (e.g., a "selfie"), or an image of his/her fingerprint, a digital recording of his/her voice, etc., which may be used to create a biometric image or pattern to be authenticated against a registered pattern of user 102.

As described previously, identification data generation module 208 of mobile computing device 104 may be configured to extract certain biometric features from the captured image, and generate a geometric or mathematical representation, or a biometric template which is a digital reference of distinct characteristics that have been extracted from a biometric sample, of user 102's facial or voice characteristics.

The biometric template may be time-stamped, so it is useful only for a limited period (e.g., 30 seconds) and encrypted by encryption module 210 for additional security. This encrypted template may be used to match against registered biometric patterns. This matching may be performed locally on the mobile computing device 104 against a template that has been registered and securely stored on memory 216. Alternatively, the biometric template may be transmitted to the service provider's data repository system(s) where biometric patterns of registered users are maintained for comparison purposes.

If a comparison of the biometric template and a registered template shows that the similarity is above a certain predetermined matching acceptable level or threshold value, user 102 is positively authenticated and the original biometric image may be deleted. Alternatively, the biometric image may be kept by the service provider for other uses, such as auditing purposes or for improving future biometric detection accuracy. If user 102 is not positively authenticated, system 100 may be configured to terminate the authentication process, or initiate a process to determine why a registered mobile computing device 102 is carried by a user that cannot be authenticated.

System 100 may be a server-based computer system in a service provider's datacenter, such that data relating to customers of the service provider are stored locally in a dedicated server or behind a firewall of the service provider's network.

Figure 3:
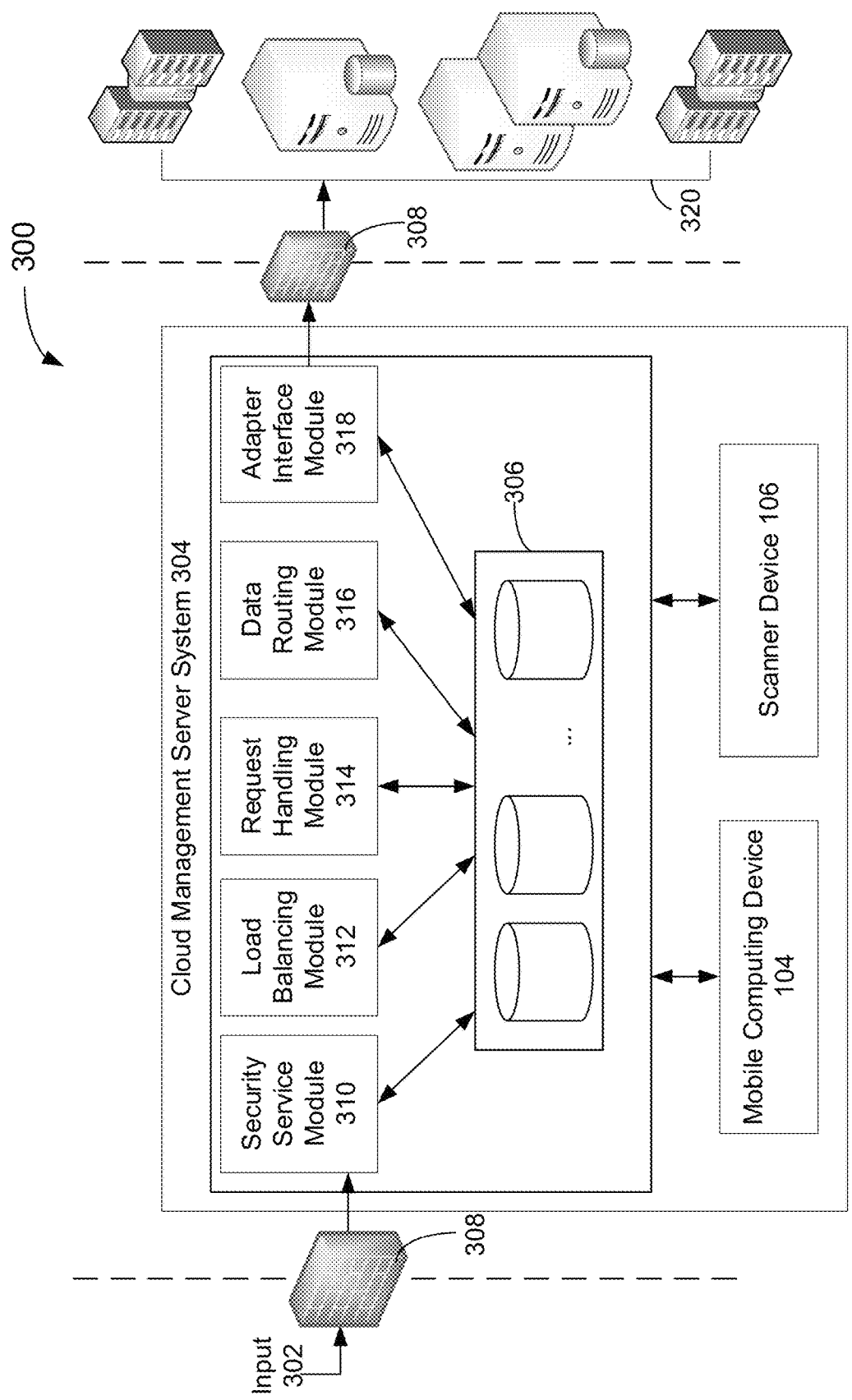
FIG. 3 illustrates a Cloud-based computing server system, according to an exemplary aspect of the present disclosure.

In one embodiment, system 100 may be deployed in a Cloud-based network. Referring to FIG. 3, a Cloud management server system 304, which may correspond to computing server system 108 in FIGS. 1 and 2, may be configured to provide functionalities for any connected client devices (e.g., mobile computing device 104 and scanner device 106) such as sharing data or provisioning resources among multiple client devices, performing computations for each connected client device, and managing information related to registered users and devices for each service provider. System 304 may include a number of data repositories 306 that are accessible by modules 310-318. For example, one of data repositories 306 may store all the metadata (e.g., run-time and design-time data, each having their own requirements on availability and performance) associated with the server system 304. A tenant or subscriber (e.g., a service provider) of the server system 304 may have a number of applications installed thereon. Each application may be versioned and have at least one versioned resource application programming interface (API), and corresponding versioned service. One of data repositories 306 may store one or more callable interfaces, which may be invoked by mobile computing device 104 and scanner device 106 of a specific service provider. The callable interface may be implemented to translate between different data formats or protocols for communication. Further, one of data repositories 306 may be used to store information about processing occurring in the Cloud management server system 304, such as messages communicated via the server system 304 and log information. Data repositories 306 may be configured to store logging and analytics data captured during processing in the Cloud management server system 304. Depending on the demand of mobile computing devices seeking to communicate with backend Cloud resources 320, the Cloud management server system 304 may be configured to handle surges and temporary periods of higher than normal traffic between each mobile computing device and other Cloud computing devices. For example, the Cloud management server system 304 may include elements that support scalability such that components may be added or replaced to satisfy demand in communication.

Input 302 (e.g., a registration request from mobile computing device 104) may be communicated to scanner device 106 and the Cloud management server system 304 via one or more callable interfaces, e.g., APIs. The Cloud management server system 304 may be protected by one or more firewalls 308 to provide a secure environment to process requests from various computing devices. For example, firewalls 308 may permit communication of messages between the Cloud management server system 304 and mobile computing device 104. Such messages (e.g., SPDY messages, hypertext transfer protocol (HTTP) messages or representational state transfer (REST) messages) may conform to a communication protocol (e.g., SPDY, HTTP, or REST). Input 302 that is received through the firewall 308 may be processed first by security service module 310 which is configured to at least restrict access to only those who have the required credentials to, e.g., user 102 biometric data. In one aspect, security authentication may be determined for a request, a session, a user, a device, other criterion related to the user, or combinations thereof. Security authentication may be performed for each request that is received or based on a previous verification of a request. Security authentication may be determined for a user or a device such that requests to different Cloud services may be authenticated based on a single verification of security.

Upon determining security authentication, the Cloud management server system 304 may use the load balancing module 312 to detect which Cloud service 320 the received request is directed to, and use a request handling module 314 to transmit each service request to an appropriate Cloud service 320. A request may be routed to an appropriate service 320 upon dispatch, or to another module of the Cloud management server system 304. The request handling module 314 may resolve a request to determine its destination based on a location (e.g., a uniform resource identifier (URI) and/or a URL of the request). The request handling module 314 may parse a request's header to extract one or more of the following information: tenant identifier, service identifier, application name, application version, request resource, operation and parameters, etc. The request handling module 314 may use the parsed information to perform a lookup in data repositories 306 and retrieve corresponding application metadata. The request handling module 314 may determine the target service based on the requested resource and the mappings in the stored metadata. Via formatting the request and any other necessary information, the request handling module 314 may place the input message on data routing module 316 for further processing, or on a queue and await the corresponding response. The request handling module 314 may process responses received from the data routing module 316 and return a response to, e.g., mobile computing device 104 and scanner device 106.

The data routing module 316 may manage delivery of messages to destinations registered with itself. The data routing module 316 may operate as a central system for managing communications in Cloud services 320, such that additional centralized services (additional authorization, debugging, etc.) may be plugged in as necessary. Data captured by the data routing module 316 may be stored in the data repositories 306.

The data routing module 316 may route messages to one or more destinations 320 directly, or with the aid of an adapter interface module 318 by translating or converting a message to a protocol supported by a receiving Cloud device 320. The adapter interface module 318 may establish separate communication connections with each of Cloud resources 320.

In accordance with aspects of the present disclosure, the Cloud management server system 304 may be configured to obtain various information and data from mobile computing device 104 and scanner device 106, and/or other data sources, conduct data capture, storage, analysis, search, sharing, transferring, querying, and updating of the obtained data using proprietary algorithms, and provide feedback to mobile computing device 104 and scanner device 106 for user/device identification and authentication purposes.

As disclosed above, system 100 may be implemented in various contexts. For example, for a pre-registered user 102 who has opted in to receive services from system 100, one or more messages or emails may be transmitted to the user 102, such that user 102 may install or refresh an application on mobile computing device 104, and opt-in for the services provided by one or more server providers. As part of a registration process, user 102 may be given the option of being recognized and greeted at other locations using system 100, and, if necessary, authenticated by at least one service provider when entering or being close to a facility where scanner device 106 has been installed. In one embodiment, user 102 may approach or enter a service provider's location (e.g., standing in front of an ATM), and if mobile computing device 104 of user 102 is broadcasting, via Wi-Fi or Bluetooth, its unique identifier (e.g., MAC address), scanner device 106 may detect the broadcast and transmit the corresponding MAC address to computing server system 108 or 304 via communication network 110.

Computing server system 108 or 304 may use the detected MAC address to compare with existing MAC addresses stored in its database (e.g., memory 240). If there is a match, computing server system 108 or 304 may trigger a "user recognized" event, communicate to the service provider's customer service representative (or similar), and give that representative access to all relevant information about user 102 that allows the representative to give a special or differentiated service to user 102. In the case of a patient entering an emergency room (ER), computing server system 108 or 304 may trigger a special event including collecting information relating to treatment of the user's conditions. In that same hospital, access to different areas may be tied to the permissions that each employee has for area access (e.g., to the pharmacy, ER, maternity ward or area where supplies are kept).

In the case of user 102 trying to make a transaction at an ATM, once computing server system 108 or 304 detects and identifies mobile computing device 104, it may send a message to the user's mobile computing device 104 or show it on the ATM screen with further instructions.

If a transaction or medical treatment is required that involves confidential, sensitive, private or secret information, for example, a monetary transfer by user 102 or administering a special medicine to a patient, system 100 may be configured to authenticate user 102 by any method including biometric authentication (facial, fingerprint, voice, etc.), or any non-biometric authentication methods chosen by the service provider.

All captured information during this process, including the unique device identifier and the user's biometric authentication data, may be encrypted and destroyed after being used, unless requested to be stored by the service provider. For example, data may be stored at the service provider's repository systems, but system 100 does not keep any of the user's information. In another embodiment, user's information may be encrypted and retained centrally by another computer system for future use upon consent from the user.

As for non-registered users who approach or enter a service provider's location and have been detected by system 100, computing server system 108 or 304 may be configured to sends a message or email to all detected mobile devices, using any of the common applications normally run on these devices, like iMessage, a common browser, etc. This message or email may be of any type, such as general information about a store or facility, an invitation for each user to register to receive further messages, an invitation to become a customer of a specific service provider, or a discount ticket for specific items, or an invitation get free WiFi connection in exchange for signing up as a new customer.

If a user decides to register for system 100, a separate and special event may be initiated by computing server system 108 or 304, which may include digital onboarding and document scanning. All captured information during this process, including the unique device identifier and the user's biometric authentication data, may be encrypted and destroyed after being used, unless requested to be stored by the service provider. For example, data may be stored at the service provider's repository systems, but system 100 does not keep any of the user's information. In another embodiment, user's information may be encrypted and retained centrally by another computer system for future use upon consent from the user.

As disclosed previously, system 100 may be used by, e.g., an agency in charge of the security of an airport, or security at a stadium for a sports or cultural event, for recognizing and authenticating "good actors." Users previously registered and on-boarded may opt-in for the services provided by such an agency by providing consent to be recognized and authenticated when entering a facility where the agency has installed one or more scanner devices 106.

If the user's device is not recognized, computing server system 108 of system 100 or 304 of system 300 may be configured to trigger a special process including the physical localization of the user and running a stricter authentication process to determine if the user is blacklisted. All captured information during this process, including the unique device identifier and the user's biometric authentication data, may be encrypted and destroyed after being used, unless requested to be stored by the service provider. For example, data may be stored at the service provider's repository systems, but system 100 does not keep any of the user's information. In another embodiment, user's information may be encrypted and retained centrally by another computer system for future use upon consent from the user.

In yet another embodiment, system 100 may provide a complimentary product or service offers, for example, WiFi service offers that are associate with a centralized registration of multiple service providers. For example, upon detecting one or more mobile computing devices 104 by scanner device 106 in the vicinity of a location, computing server system 108 or 304 may send a message or email to all users whose devices have been detected but are not registered an offer of free WiFi, for example, at the location they are at and at all locations with system 100 in exchange for registering and agreeing to the terms of service. Such a user may be asked to opt in to receive additional services of system 100 and agree to the service agreement which will explain that opting in to use the free WiFi means that they are opting to be detected, recognized and greeted at any service provider location of system 100. If the user decides to register for such additional services, a separate and special event may be initiated by computing server system 108 or 304, which may include digital onboarding and document scanning to confirm identity. Information captured during this process, including the unique device identifier and users' data (not service provider's data), may be encrypted and retained centrally by computing server system 108 or 304 with users' consent. A continuous log of all interactions with the user may be retained by computing server system 108 or 304 and may be used by system 100 for operational purposes, for billing purposes, and for proactively reaching out to users to offer goods and services personalized to the user's characteristics.

Moreover, system 100 may implement a white list product for user 102, such that a dashboard of participating service providers or service providers may be shown via interface 212 of mobile computing device 104 where user 102 may check off the boxes of those places where he/she would like to be recognized when entering the locations of the service provider. As such, system 100 may be implemented as a hub connecting participating service providers or service providers with participating individuals. For example, system 100 may include a number of participating service providers or service providers (e.g., 10 banks, 20 restaurant chains, 30 retailers, 40 hospitals and 100 other organizations). In addition to messaging and connecting with their existing customers who have opted in, these service providers may use system 100 to connect to others who have indicated that they want to be detected, recognized and greeted when they enter the premises of these service providers, but only if these service providers have permission to do so. When being provided an application and a sign-up experience, a user may have the option to choose from some or all of the participating service providers to be detected, recognized and greeted as he/she enters the location of the participating service provider. Alternatively, the user may select certain businesses (e.g., 1 bank, 3 restaurants, 5 retailers).

Further, system 100 may be configured to enable each of the service providers to create a customized experience for a detected user. That is, system 100 may be used by each individual service provider or service provider to offer its existing customers an opportunity to register their smart devices, so that as they approach a location of the service provider or service provider, they may be instantly detected, recognized, greeted by name and provided with differentiated services (e.g., a short VIP line or immediate attention from a bank representative). For example, at a restaurant such as Starbucks or Burger King, system 100 may be configured to allow a user to have a regular order automatically placed as the user enters the store. For another example, a registered user of system 100 may walk into a coffee shop and a message may be shown on the detected mobile computing device of the user: "Welcome back! Click here to order and pay for your usual Decaf Cappuccino." The user may bypass the line and go straight to the pickup area for mobile orders.

User authentication may be carried out when a service provider or service provider or a user intends to follow a process that involves confidential, proprietary or sensitive information (e.g., a monetary transaction, providing the user with access to a restricted area, or a medical procedure to the user). Data relating to its users or customers may be stored or retained locally in a dedicated server of each service provider or behind each service provider's firewall. For example, a bank may have its customers' information and biometric information safely stored behind its corporate firewall.

In accordance with other aspects of the present disclosure, system 100 may be implemented as a hub for people who want to be recognized at certain locations. For example, a user may opt in through a corporate sponsor such as Chase bank or Burger King, or may sign up directly through a website or app associated with system 100 to be greeted at various participating locations. Specifically, each individual user may be provided with a homepage or dashboard on his/her mobile computing device 104 where all participating service providers and service providers (e.g., companies like Chase bank and Burger King) may be presented and the user may choose to opt in or opt out of being recognized when entering these service providers' stores. As a result, a user may indicate a preference to be recognized at Chase bank and Starbucks but not want to be recognized at other locations such as Walmart. Each pieces of user's information (e.g., device information, biometric or non-biometric information, other confidential or sensitive user information) may be encrypted and retained centrally by another computer system for future use upon consent from each user. In one aspect, system 100 in this embodiment may serve as a hub for all participating service providers and service providers and information that will be shared between these service providers and service providers may include the name of each user and device identifying information of each user. Any specific user information held by each service provider and service provider (e.g., user financial information obtained by a bank) may not be shared.

In accordance with another aspects of the present disclosure, when a user registers on an app associated with system 100 that may be recently downloaded or refreshed and provides consent to be identified, a unique identifier (e.g., MAC address of mobile computing device 104) may be captured by system 100 and added to a user's profile in the users' database kept at a service provider's site or at a proprietary datacenter of system 100.

During this registration process, processor 202 of mobile computing device 104 may be configured to either establish a connection of the device 104 to a specific service provider's WiFi or add the service provider's WiFi network credentials to the list of "trusted" WiFi networks on the device 104. In one embodiment, such WiFi may be common across all of the service provider's locations (e.g., a dedicated WiFi solely for user registration and recognition purposes). For example, such WiFi connection may be provided by scanner device 106 which may serve as a "hot spot" for WiFi connections. This registration process may tag the dedicated WiFi as a "trusted" network on the device 104, and an automatic connection will be established the next time the user carrying the device 104 near the service provider's location.

For example, when the user enters any location of a particular service provider, not necessarily the same location where the registration process took place, the mobile computing device 104 carried by the user will connect to the dedicated WiFi and be recognized immediately.

Figure 4:
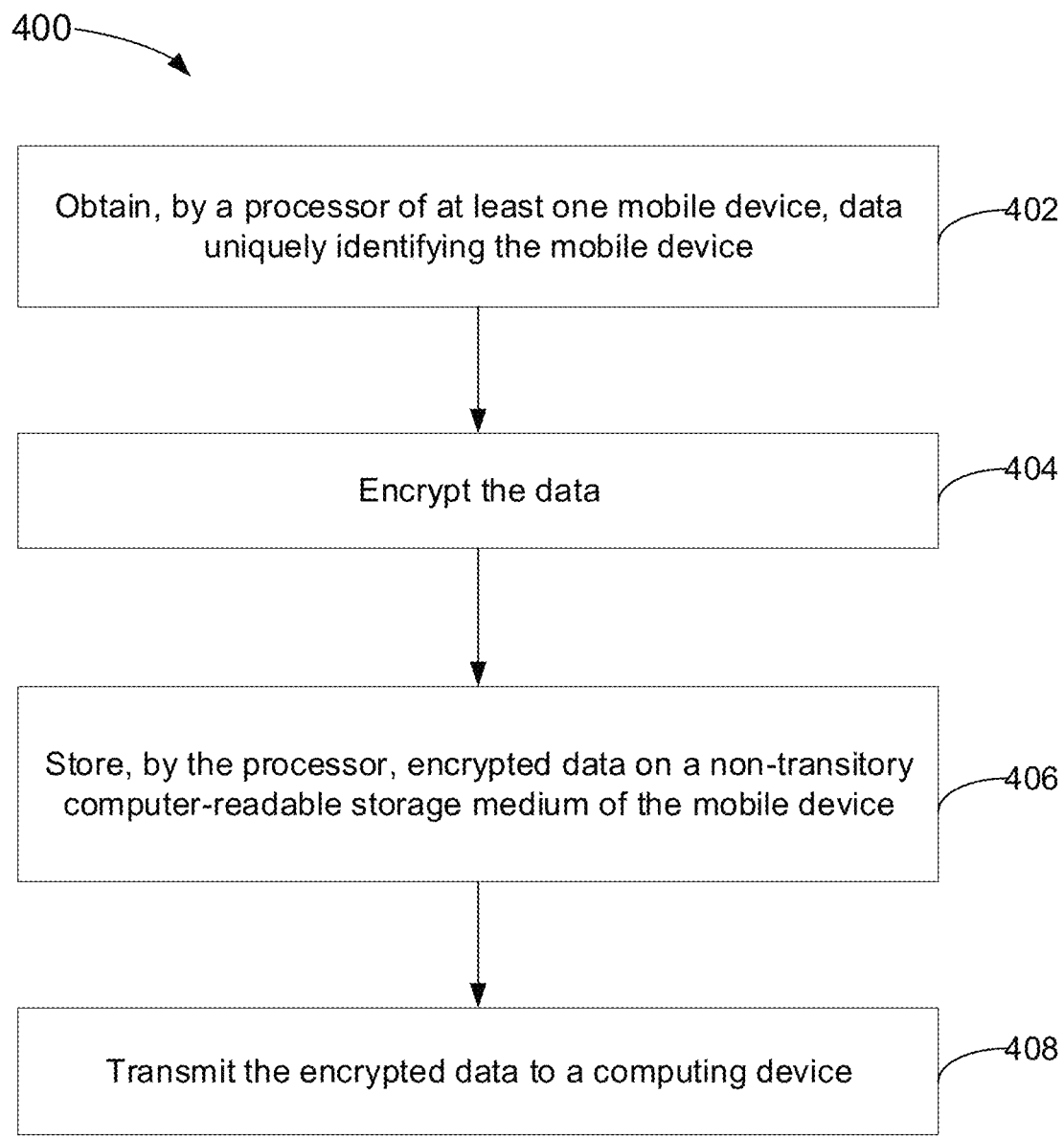
FIG. 4 illustrates a flow chart of a method implemented by a mobile computing device, according to an exemplary aspect of the present disclosure.

Referring to FIG. 4, a flow chart of method 400 implemented by mobile computing device 104 of FIGS. 1 and 2 is illustrated, according to aspects of the present disclosure. Method 400 may include obtaining (402), by a processor of mobile computing device 104, data uniquely identifying the mobile device; and encrypting (404) the data. Method 400 also includes storing (406), by the processor, encrypted data on a non-transitory computer-readable storage medium of the mobile device; and transmitting (408) the encrypted data to a computing device (e.g., scanner device 106).

Figure 5:
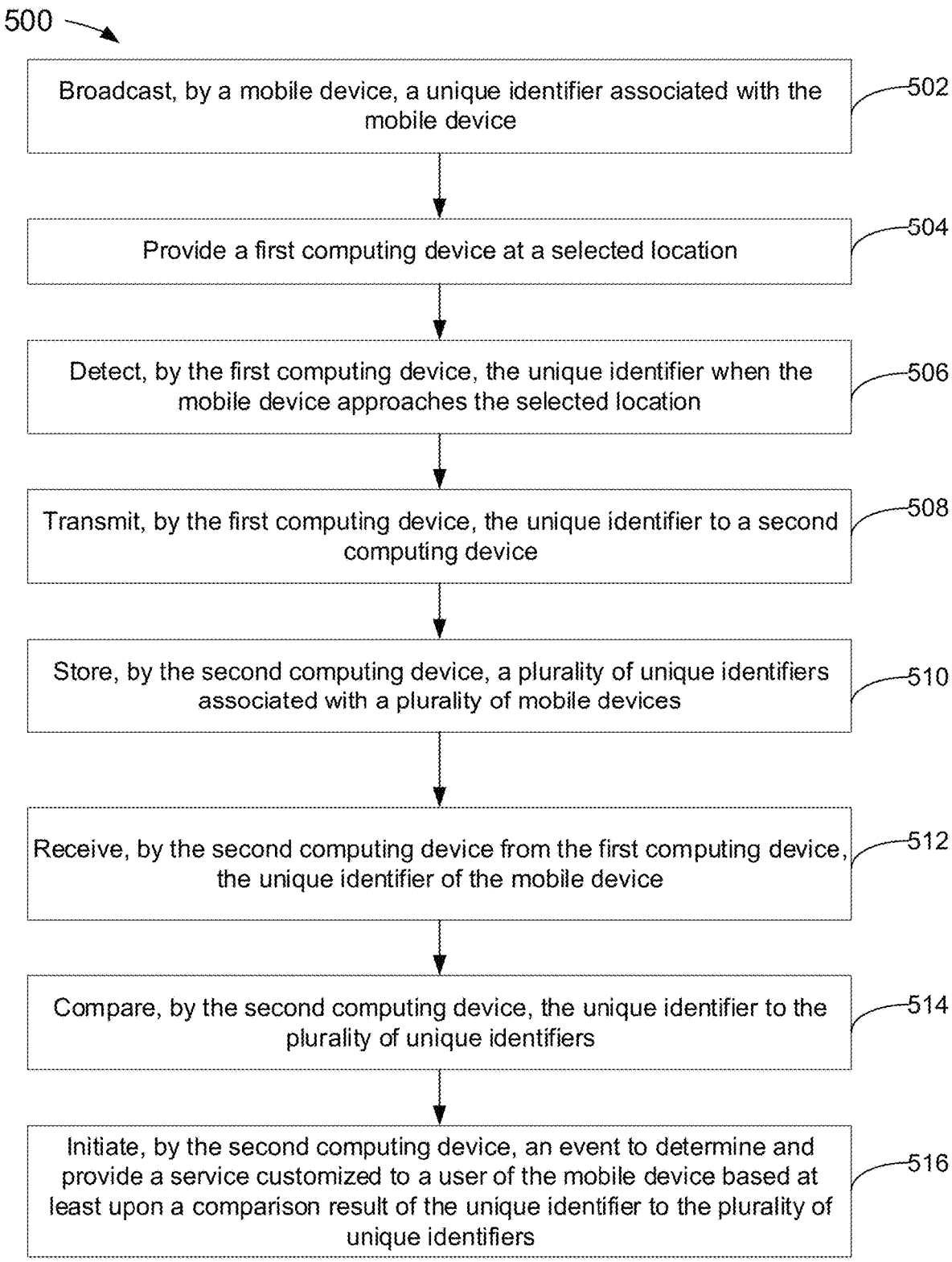
FIG. 5 illustrates a flow chart of a method implemented by the system of FIG. 1, according to an exemplary aspect of the present disclosure.

Referring to FIG. 5, a flow chart of method 500 implemented by mobile computing device 104, scanner device 106 and computer server system 108 of FIGS. 1 and 2 is illustrated, according to aspects of the present disclosure. Method 500 may include broadcasting (502), by a mobile device (e.g., mobile computing device 104), a unique identifier associated with the mobile device; providing (504) a first computing device (e.g., scanner device 106) at a selected location; detecting (506), by the first computing device, the unique identifier when the mobile device approaches the selected location; transmitting (508), by the first computing device, the unique identifier to a second computing device (e.g., computer server system 108); storing (510), by the second computing device, a plurality of unique identifiers associated with a plurality of mobile devices; receiving (512), by the second computing device from the first computing device, the unique identifier of the mobile device; comparing (514), by the second computing device, the unique identifier to the plurality of unique identifiers; and initiating (516), by the second computing device, an event to determine and provide a service customized to a user of the mobile device based at least upon a comparison result of the unique identifier to the plurality of unique identifiers.

Figure 6:
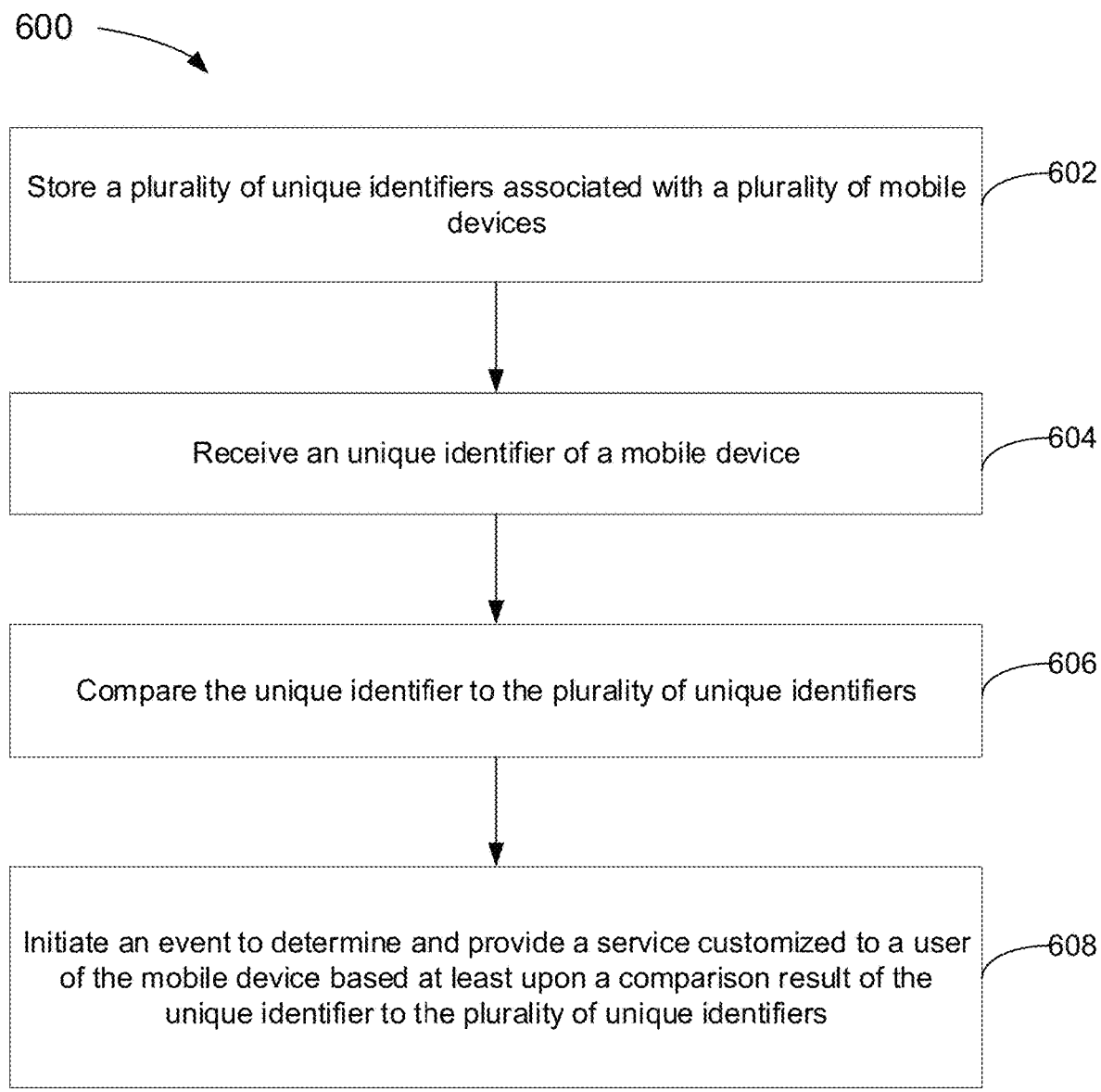
FIG. 6 illustrates a flow chart of a method implemented by a computer server system, according to an exemplary aspect of the present disclosure.

Referring to FIG. 6, a flow chart of method 600 implemented by computer server system 108 of FIGS. 1 and 2 is illustrated, according to aspects of the present disclosure. Method 600 may include storing (602), by a processor of computer server system 108, a plurality of unique identifiers associated with a plurality of mobile devices; receiving (604), a unique identifier of the mobile device; comparing (606) the unique identifier to the plurality of unique identifiers; and initiating (608) an event to determine and provide a service customized to a user of the mobile device based at least upon a comparison result of the unique identifier to the plurality of unique identifiers.

As described above, user authentication may not be necessary when a service provider communicates with a user and provides non-risky additional service to this user, or for marketing or promotion purposes. User authentication may be recommended and encouraged when the service provider or the user intend to follow a process that involves for example, but not limited to, a monetary transaction, providing the user with access to a restricted area, a medical procedure to the user, etc. In one embodiment, a registration process for registering a user and his/her mobile device (e.g., a smart device), in case that the user and/or his/her device has not been previously registered, storing identifying data obtained during the registration process in a storage database, such that the user and/or his/her device can be uniquely identified and authenticated in a future process.

Figure 7:
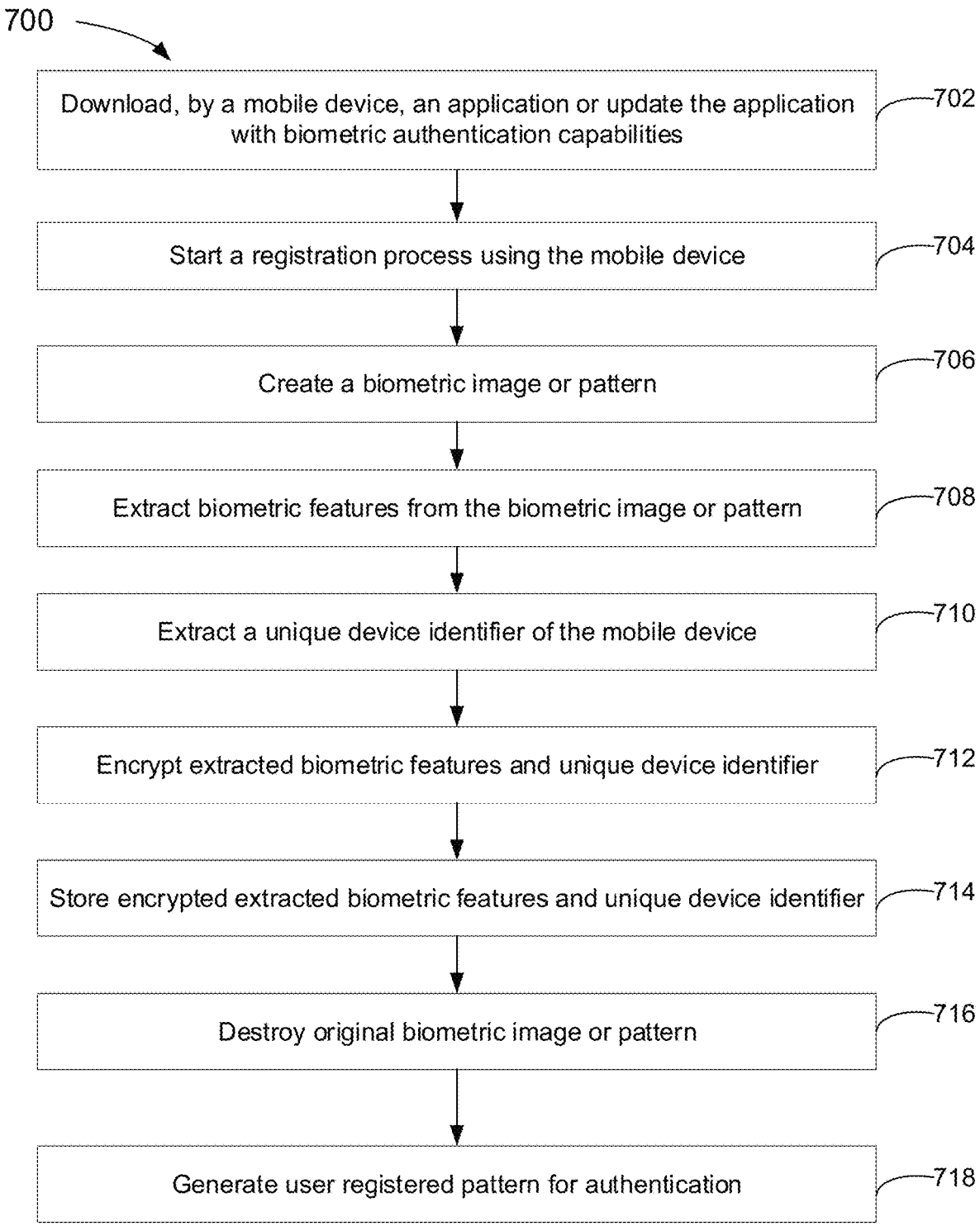
FIG. 7 illustrates a flow chart of a method implemented by a mobile computing device, according to an exemplary aspect of the present disclosure.

Referring now to FIG. 7, a flow chart of method 700 implemented by mobile computing device 104 of FIGS. 1 and 2 is illustrated, according to aspects of the present disclosure. Method 700 may be implemented for performing a user and his/her mobile device registration for future user identification and authentication. In addition, method 700 may be performed when a user has not been previously registered, or the user has not previously registered his/her mobile device (e.g., smart device).

If a user's biometrics characteristics and/or this user's smart device have been previously registered, or if a service provider has previously implemented an authentication system, method 700 may be implemented in relevant portions. For example, if a user has his/her biometrics characteristics already registered but not his/her smart device registered, method 700 may be followed only insofar as it pertains to the registration of his/her smart device.

As shown in FIG. 7, a user may download (702) on his/her mobile computing device 104 (e.g., a smart device) an application or update an existing application provided by a service provider that allows capturing the user's biometric characteristics and smart device identification data for future identification and authentication. If the service provider intends to use an existing biometric or non-biometric authentication method (not shown), step 702 may be only followed to register the user's smart device.

In step 704, the user may open a graphical user interface (GUI) on his/her smart device 104 provided as a part of the service provider's registration application, and start a registration process. In step 706, the service provider's registration application may be configured to capture the user's unique biometric or non-biometric characteristics in the form of an image or other data, which may be a photograph or "selfie," a digital fingerprint, a voice recording, a palm image, a digital signature, a username and password, a token, etc.

In step 708, a unique pattern may be created from the image or data captured in step 706, which may include a mathematical and/or geometrical representation of the biometric characteristic of the user. In step 710, a unique code or identifier may be extracted from the mobile computing device 104 being registered by the user. This unique identifier may include for example, but not limited to, a smart device factory MAC address. The user may register more than one smart device, and the service provider's registration application may extract the unique identifier from each device.

In step 712 and for additional security, the biometric pattern and the unique identifier captured in steps 708 and 710 may be encrypted, and in step 714 this encrypted pattern and identifier may be stored on the user's mobile computing device 104, or transmitted via the Internet or other means (e.g., communication network 110 of FIGS. 1 and 2), to the service provider and stored on the service provider's storage database, on the Cloud or on any other storage database chosen by the service provider.

In step 716, the original image and data captured in step 706 may either be destroyed, thereby making it impossible to retrieve maliciously by other parties, or if needed, the service provider may keep it for auditing purposes for example. In step 718 and once the biometric or non-biometric pattern and the smart device identifier have been stored, user registered pattern is ready for an authentication process shown in FIG. 8.

Figure 8:
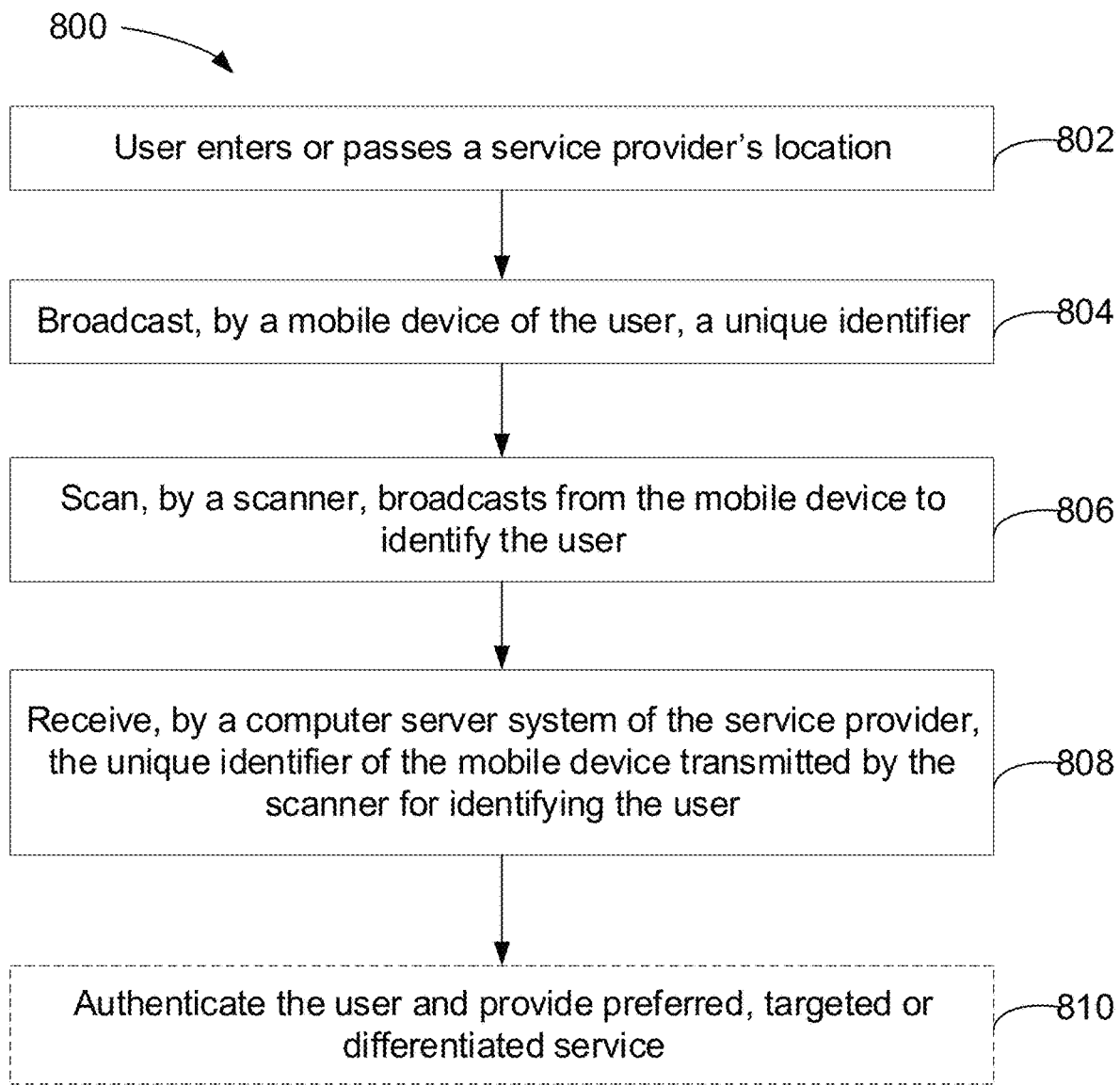
FIG. 8 illustrates a flow chart of a method for identifying and authenticating a user who enters or passes a location configured by a service provider, according to an exemplary aspect of the present disclosure.

According to aspects of the present disclosure, FIG. 8 shows a method 800 for identifying and authenticating a user who enters or passes a location configured by a service provider (step 802). A mobile computing device carried by the user (e.g., mobile computing device 104 of FIGS. 1 and 2) may be configured to broadcast its unique identification number or code. In step 806, a scanner or any suitable signal detection device (e.g., scanner device 106 of FIGS. 1 and 2) may be configured to continuously scan for broadcasts from the mobile computing device to identify the user. In one embodiment, once the MAC address (factory MAC address) or other unique identifier of the mobile computing device is captured by the scanner and transmitted to a computer server system of the service provider (step 808), the user registered to that mobile computing device may be identified. As a result, process 900 shown in FIG. 9 may be triggered by the computer server system of the service provider to provide a preferential or differentiated service by the service provider to the identified user. Process 900 may include an authentication of the user through biometric or some other preferred authentication method by the service provider to provide further services to the user, which may include, but is not limited to, a monetary transaction, provide the user with access to a restricted area, a medical procedure to the user, etc.

Figure 9:
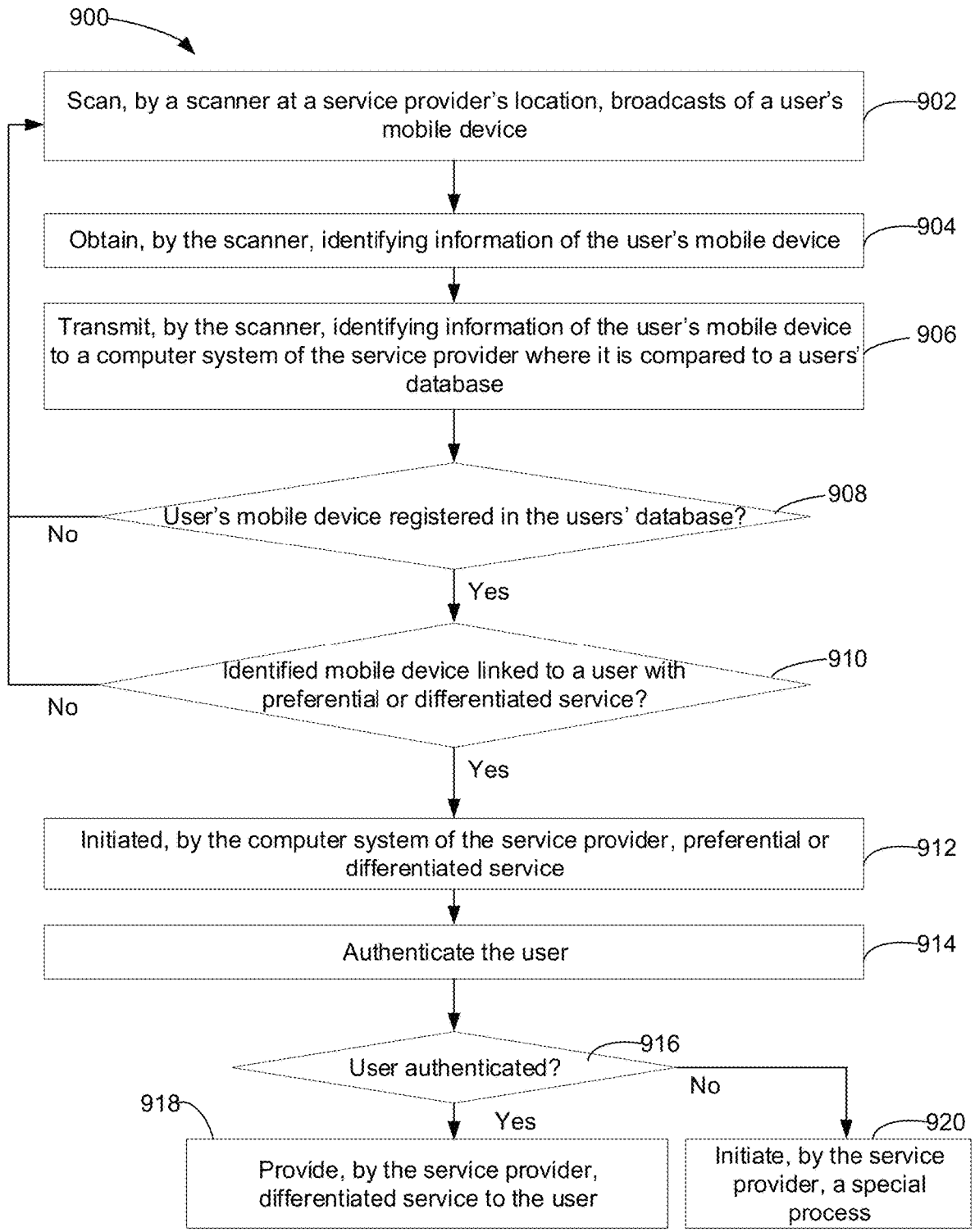
FIG. 9 illustrates a flow chart of a method for user identification and authentication at a service provider's location, according to an exemplary aspect of the present disclosure.

Referring now to FIG. 9, in step 902, a scanner implemented at a service provider's location may be configured to continuously scan for WiFi, Bluetooth or other short or medium range communication signals broadcasted by a mobile computing device carried by a user (e.g., mobile computing device 104 of FIGS. 1 and 2) in order to identify devices carried by registered users.

In step 904, once the scanner detects a signal, the scanner may be configured to obtain identifying information (e.g., the factory MAC address or other unique device identifier) of the user's mobile device, determine the type of mobile device, approximate the distance of the mobile device from the scanner, and if possible the brand of the mobile device.

In step 906, the scanner may transmit the identifying information of the user's mobile device to a service provider's computer system (e.g., computing server system 108 of FIGS. 1 and 2) at the service provider's location where the user's mobile device is identified, or to a remote location via the Internet or other means (e.g., communication network 110 of FIGS. 1 and 2), where the identifying information may be compared against previously registered devices in a users' database through a matching application and process.

In step 908, the matching application and process may determine whether the user's mobile device identified is registered to an existing device in the users' database. If the device does not match any of the registered devices in the database, the identifying information may be destroyed and the scanner continues scanning for other mobile devices near the service provider's location, going back to step 902.

On the other hand, upon detecting that the user's mobile device matches a registered device in the users' database, in step 910, the matching application and process may be configured to gather user information linked to the registered device.

In step 910, the matching application and process also determines if the user linked to the device identified is someone who needs preferential, targeted or differentiated service. If the user is not identified as someone who needs preferential, targeted or differentiated service, the identifying information may be destroyed and the scanner continues scanning for other mobile devices near the service provider's location, going back to step 902.

If the user is indeed identified as someone who needs preferential, targeted or differentiated service, then in step 912 the service provider's computer system may initiate the preferential or differentiated service including, but is not limited to, sending personal communications, coupons or rebates to the user's mobile device, or sending an employee to greet the user and, depending on the nature of the visit of the user to the service provider's location, authenticate the user in order for the service provider to provide further services, for example allow monetary transactions.

In step 914, if the nature of the user visit to the service provider's location justifies it (e.g., transactions involving confidential, sensitive, secret or proprietary information), the identity of the user may be authenticated either through biometric or some other authentication method preferred by the service provider.

If the authentication is performed using the user's biometric information, the authentication may be done locally with the matching done on the user's mobile device, or with the matching done on the service provider's premises, remotely (for example on the Cloud) or on any other system and location preferred by the service provider.

In step 916, if the user is positively authenticated 918, the service provider may provide further preferential services depending on the nature of the user's visit to the service provider's location.

If the user is not positively authenticated 920, then the service provider may initiate a special process that may include finalizing the process 900 and returning to step 902, or determining why the user is carrying a mobile device registered to another user.

Figure 10:
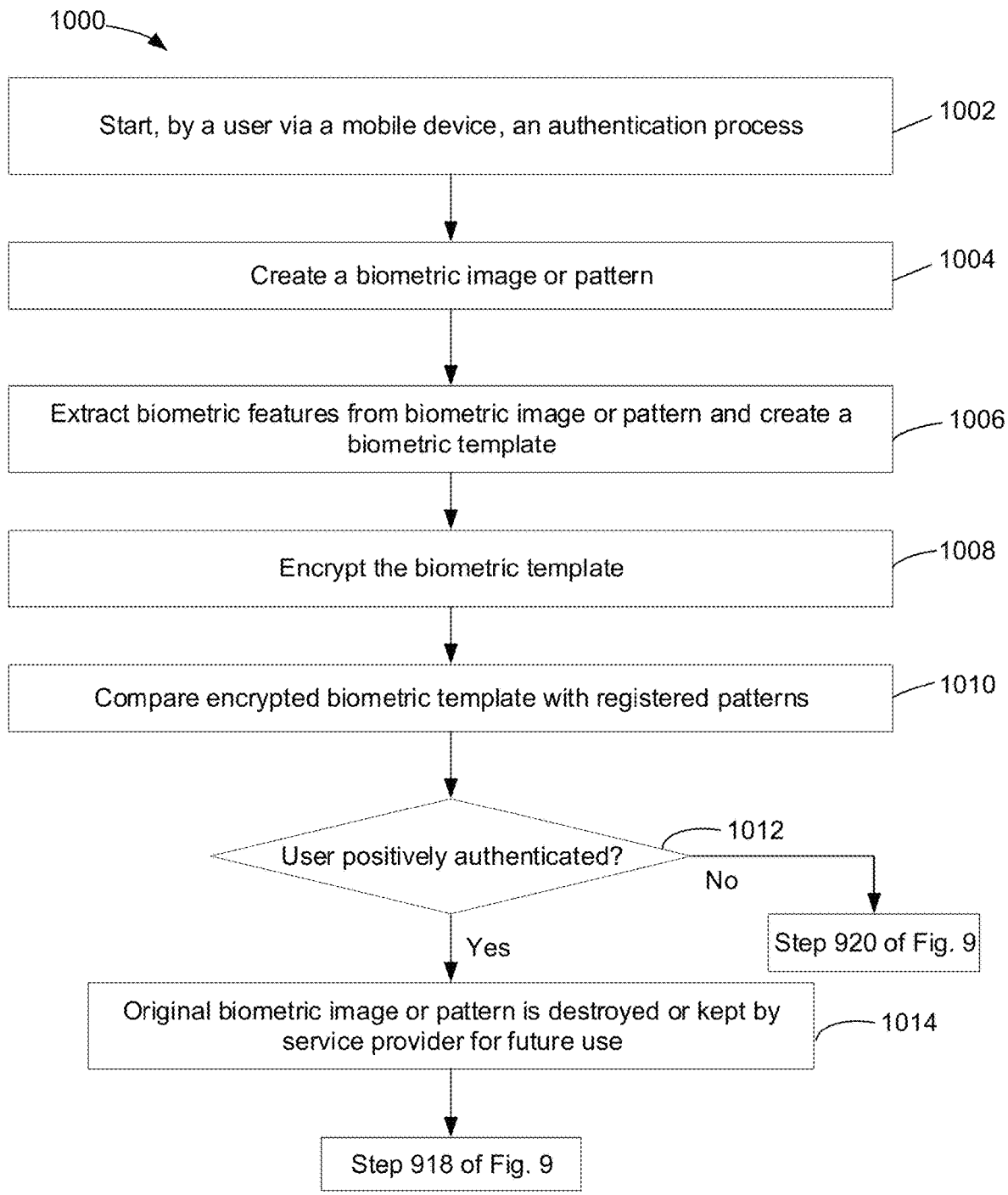
FIG. 10 illustrates a flow chart of a user biometric authentication method, according to an exemplary aspect of the present disclosure.

FIG. 10 shows an example authentication method 1000 using at least a portion of a user's biometric characteristics, according to aspects of the present disclosure. In step 1002, a user may uses his/her smart device to capture an image of his/her face (a "selfie"), or an image of his/her fingerprint, a digital recording of his/her voice, etc., which may be used in step 1004 to create a biometric image or pattern to be authenticated against a registered pattern from that same user.

In step 1006, selected biometric features may be extracted from the image captured in step 1002, for example, but not limited to, a geometric or mathematical representation of the facial or voice characteristics of the user and a biometric template may be created accordingly.

In step 1008, the biometric template may be encrypted for additional security. In step 1010, this encrypted biometric template may be used to match against registered biometric patterns as described above. This matching process may be carried out locally on the user's mobile device. Alternatively, the biometric template may be transmitted to the service provider's computer system where the service provider keeps patterns collected from registered users.

In step 1012, if the user is positively identified 1014, i.e., the comparison of the biometric template created in step 1006 and a registered biometric template confirms a similarity exceeding a predetermined matching acceptable level, the original biometric image may be destroyed and process 1000 continues with step 918 of FIG. 9. In another embodiment, the biometric image may be kept by the service provider for other uses, for example for auditing purposes. If the user is not positively authenticated, process 1000 continues with step 920 of FIG. 9.

Figure 11:
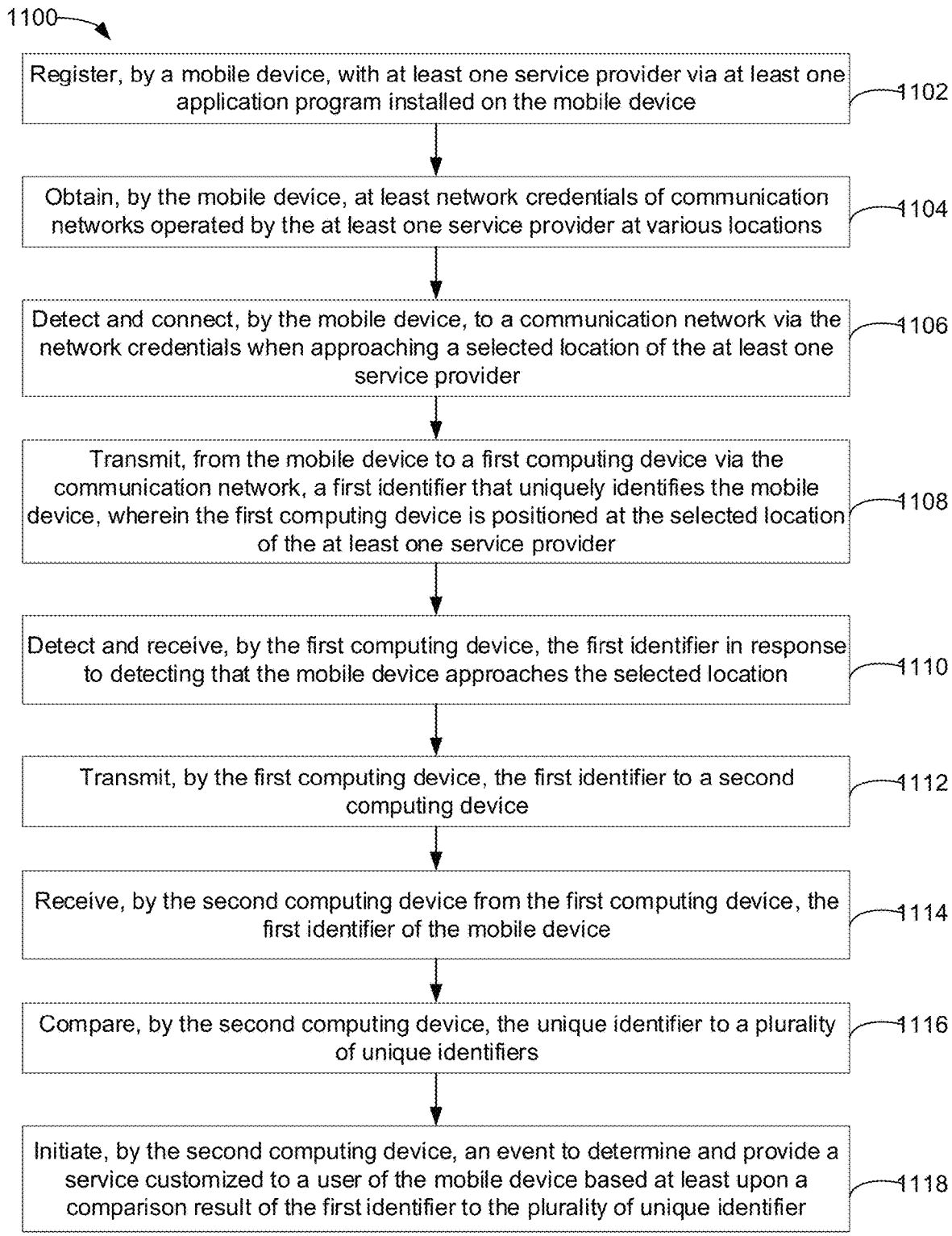
FIG. 11 illustrates a flow chart of a method implemented by the system of FIG. 1, according to an exemplary aspect of the present disclosure.

FIG. 11 shows an example method 1100 implemented by the system of FIG. 1, according to aspects of the present disclosure. Method 1100 may include registering (1102), by a mobile device (e.g., mobile computing device 104 of FIGS. 1 and 2), with at least one service provider via at least one application program installed on the mobile device; obtaining (1104), by the mobile device, at least network credentials of communication networks operated by the at least one service provider at various locations; detecting and connecting (1106), by the mobile device, to a communication network via the network credentials when approaching a selected location of the at least one service provider; transmitting (1108), from the mobile device to a first computing device (e.g., scanner device 106) via the communication network, a first identifier that uniquely identifies the mobile device (e.g., factory MAC address), wherein the first computing device is positioned at the selected location of the at least one service provider.

Method 1100 may also include detecting and receiving (1110), by the first computing device, the first identifier in response to detecting that the mobile device approaches the selected location; transmitting (1112), by the first computing device, the first identifier to a second computing device (e.g., computer server system 108); receiving (1114), by the second computing device from the first computing device, the first identifier of the mobile device; comparing (1116), by the second computing device, the unique identifier to a plurality of unique identifiers; and initiating (1118), by the second computing device, an event to determine and provide a service customized to a user of the mobile device based at least upon a comparison result of the first identifier to the plurality of unique identifiers.

In various aspects, the systems and methods described herein may be implemented in hardware, software, firmware, or any combination thereof. In the interest of clarity, not all of the routine features of the aspects are disclosed herein. It will be appreciated that in the development of any actual implementation of the present disclosure, numerous implementation-specific decisions may be made in order to achieve the developer's specific goals, and that these specific goals will vary for different implementations and different developers.

Furthermore, it is to be understood that the phraseology or terminology used herein is for the purpose of description and not of restriction, such that the terminology or phraseology of the present specification is to be interpreted by the skilled in the art in light of the teachings presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A system, comprising:
a first computing device, comprising:
  a non-transitory computer-readable storage medium having instructions stored thereon, and
  a processor coupled to the non-transitory computer-readable storage medium and configured to execute instructions for performing, through a website or an application associated with the system, a registration process of a user consenting to one or more services provided by a service provider by at least:
    obtaining information relating to the user and a mobile computing device of the user,
    transmitting the information relating to the user and the mobile computing device of the user to a server computing device,
    receiving at least network credentials of communication networks at various locations operated by the service provider, and
    storing the network credentials as trusted and secure networks on the mobile computing device; and
a second computing device positioned at a selected location of the service provider, wherein the mobile computing device is configured to connect with the second computing device via the network credentials when the user carrying the mobile computing device is within a range of the selected location, wherein the second computing device is configured to detect a unique identifier broadcast by the mobile computing device and transmit the unique identifier of the mobile computing device to the server computing device,
a third computing device associated with the service provider for processing a monetary transaction initiated by the user carrying the mobile computing device,
wherein the server computing device is configured to receive the unique identifier of the mobile computing device from the second computing device, compare the unique identifier to the information relating to the user and the mobile computing device of the user received from the registration process, and determine a comparison result of the unique identifier to the information relating to the user and the mobile computing device of the user received from the registration process,
wherein the third computing device is configured to determine whether to allow the monetary transaction initiated by the user carrying the mobile computing device in accordance with the comparison result.

2. The system of claim 1, wherein the server computing device is further configured to determine whether to grant access to an area to the user based at least upon the comparison result, wherein the area includes one of an airport, a security check point at a stadium for a sports or cultural event, a building, a maternity ward, an area where supplies are kept, a bus or train station, a school or college campus, a government institution, or an area that requires permissions for area access.

3. The system of claim 1, wherein the unique identifier of the mobile computing device includes one of a Bluetooth personal area network device identifier, an electronic serial number, or a factory media access control address of the mobile computing device.

4. The system of claim 1, wherein the mobile computing device and the second computing device are configured to synchronize to a common time source in order to negotiate a time frame for exchange of synchronization information.

5. The system of claim 4, wherein the second computing device is configured to continuously broadcast at least one synchronization beacon signal with a selected signal strength, wherein the mobile computing device is configured to detect the selected signal strength against a selected threshold.

6. The system of claim 1, wherein the second computing device is configured to be installed on mobile platforms including one of an automobile, a train, a ship, or an airplane.

7. The system of claim 1, wherein the second computing device is configured to process signals received from mobile computing device and encrypt confidential or proprietary data into an encoded form before transmitting to the server computing device.

8. The system of claim 7, wherein the server computing device is configured to decrypt received signals from the second computing device to determine one or more of a device identifier associated with the mobile computing device, a type of the mobile computing device, an approximate distance between the mobile computing device and the second computing device, and a brand of the mobile computing device.

9. The system of claim 8, wherein the first computing device is further configured to perform a user identification process during the registration process of the user by at least obtaining biometric and non-biometric information of the user.

10. The system of claim 9, wherein the server computing device is configured to receive the biometric and non-biometric information of the user, encrypt the biometric and non-biometric information of the user, and store encrypted biometric and non-biometric information of the user in a dedicated server of the service provider or behind the service provider's firewall.

11. A computer-implemented method, comprising:
performing, by a first computing device through a website or an application associated with a system, a registration process of a user consenting to one or more services provided by a service provider by at least obtaining information relating to the user and a mobile computing device of the user;
transmitting the information relating to the user and the mobile computing device of the user to a server computing device;
receiving at least network credentials of communication networks at various locations operated by the service provider;
storing the network credentials as trusted and secure networks on the mobile computing device;
positioning a second computing device at a selected location of the service provider;
connecting the mobile computing device with the second computing device via the network credentials when the user carrying the mobile computing device is within a range of the selected location;
processing, by a third computing device associated with the service provider, a monetary transaction initiated by the user carrying the mobile computing device;
detecting, by the second computing device, a unique identifier broadcast by the mobile computing device;
transmitting, by the second computing device, the unique identifier of the mobile computing device to the server computing device;
receiving, by the server computing device, the unique identifier of the mobile computing device from the second computing device;
comparing, by the server computing device, the unique identifier to the information relating to the user and the mobile computing device of the user received from the registration process;
determining, by the server computing device, a comparison result of the unique identifier to the information relating to the user and the mobile computing device of the user received from the registration process; and
determining, by the third computing device, whether to allow the monetary transaction initiated by the user carrying the mobile computing device in accordance with the comparison result.

12. The computer-implemented method of claim 11, further comprising determining, by the server computing device, whether to grant access to an area to the user based at least upon the comparison result, wherein the area includes one of an airport, a security check point at a stadium for a sports or cultural event, a building, a maternity ward, an area where supplies are kept, a bus or train station, a school or college campus, a government institution, or an area that requires permissions for area access.

13. The computer-implemented method of claim 11, wherein the unique identifier of the mobile computing device includes one of a Bluetooth personal area network device identifier, an electronic serial number, or a factory media access control address of the mobile computing device.

14. The computer-implemented method of claim 12, further comprising synchronizing the mobile computing device and the second computing device to a common time source in order to negotiate a time frame for exchange of synchronization information.

15. The computer-implemented method of claim 14, further comprising:
continuously broadcasting, by the second computing device, at least one synchronization beacon signal with a selected signal strength; and
detecting, by the mobile computing device, the selected signal strength against a selected threshold.

16. The computer-implemented method of claim 12, further comprising installing the second computing device on mobile platforms including one of an automobile, a train, a ship, or an airplane.

17. The computer-implemented method of claim 16, further comprising processing signals received from mobile computing device by the second computing device, and encrypting confidential or proprietary data into an encoded form before transmitting to the server computing device.

18. The computer-implemented method of claim 11, further comprising decrypting received signals from the second computing device by the server computing device to determine one or more of a device identifier associated with the mobile computing device, a type of the mobile computing device, an approximate distance between the mobile computing device and the second computing device, and a brand of the mobile computing device.

19. The computer-implemented method of claim 11, further comprising performing, by the first computing device, a user identification process during the registration process of the user by at least obtaining biometric and non-biometric information of the user.

20. The computer-implemented method of claim 19, further comprising:
receiving the biometric and non-biometric information of the user by the server computing device;
encrypting the biometric and non-biometric information of the user; and
storing encrypted biometric and non-biometric information of the user in a dedicated server of the service provider or behind the service provider's firewall.

* * * * *